United States Patent [19]
Suda et al.

[11] Patent Number: 6,052,656
[45] Date of Patent: *Apr. 18, 2000

[54] NATURAL LANGUAGE PROCESSING SYSTEM AND METHOD FOR PROCESSING INPUT INFORMATION BY PREDICTING KIND THEREOF

[75] Inventors: Aruna Rohra Suda; Suresh Jeyachandran, both of Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/493,352

[22] Filed: Jun. 21, 1995

[30] Foreign Application Priority Data

Jun. 21, 1994 [JP] Japan ................................. 6-138888
Jun. 12, 1995 [JP] Japan ................................. 7-144683

[51] Int. Cl.[7] ............................................. G06F 17/27
[52] U.S. Cl. ............................................................. 704/9
[58] Field of Search ......................... 395/2.66, 751, 395/752, 754, 755, 759, 760; 704/1, 2, 4, 5, 9, 10, 257

[56] References Cited

U.S. PATENT DOCUMENTS 4,931,935 6/1990 Ohira et al. .
4,947,438 8/1990 Paeseler .
4,980,829 12/1990 Okajima et al. .
4,984,178 1/1991 Hemphill et al. .
5,056,021 10/1991 Ausborn .
5,083,268 1/1992 Hemphill et al. ........................ 395/759
5,210,689 5/1993 Baker et al. .
5,267,156 11/1993 Nomiyama .
5,321,608 6/1994 Namba et al. .
5,652,898 7/1997 Kaji .

FOREIGN PATENT DOCUMENTS 0467527 1/1992 European Pat. Off. ........ G06F 15/38

OTHER PUBLICATIONS

"A Knowledge–Based System for Chinese NLP" by Wang Minghui et al.; Proceedings TENCON '93 IEEE Region 10 Inter'l. Conference on Computer, Communication, Control and Power Engineering; vol. 2 of 5; Oct. 19–21, 1993 Beijing; pp. 1086–1089.

*Primary Examiner*—Robert A. Weinhardt
*Attorney, Agent, or Firm*—Fitzpatrick, Cella, Harper & Scinto

[57] ABSTRACT

A natural language processing method, by which a sequence of natural language information is analyzed so as to derive a concept represented by the information. In this method, the input natural language information is sequentially processed as word by word. At that time, the kind of a subsequent word is expected from a currently processed word by using knowledge concerning the word order of words in the natural language information. Thus the processing is performed by eliminating ambiguity in the information on the basis of such an expectation.

23 Claims, 63 Drawing Sheets

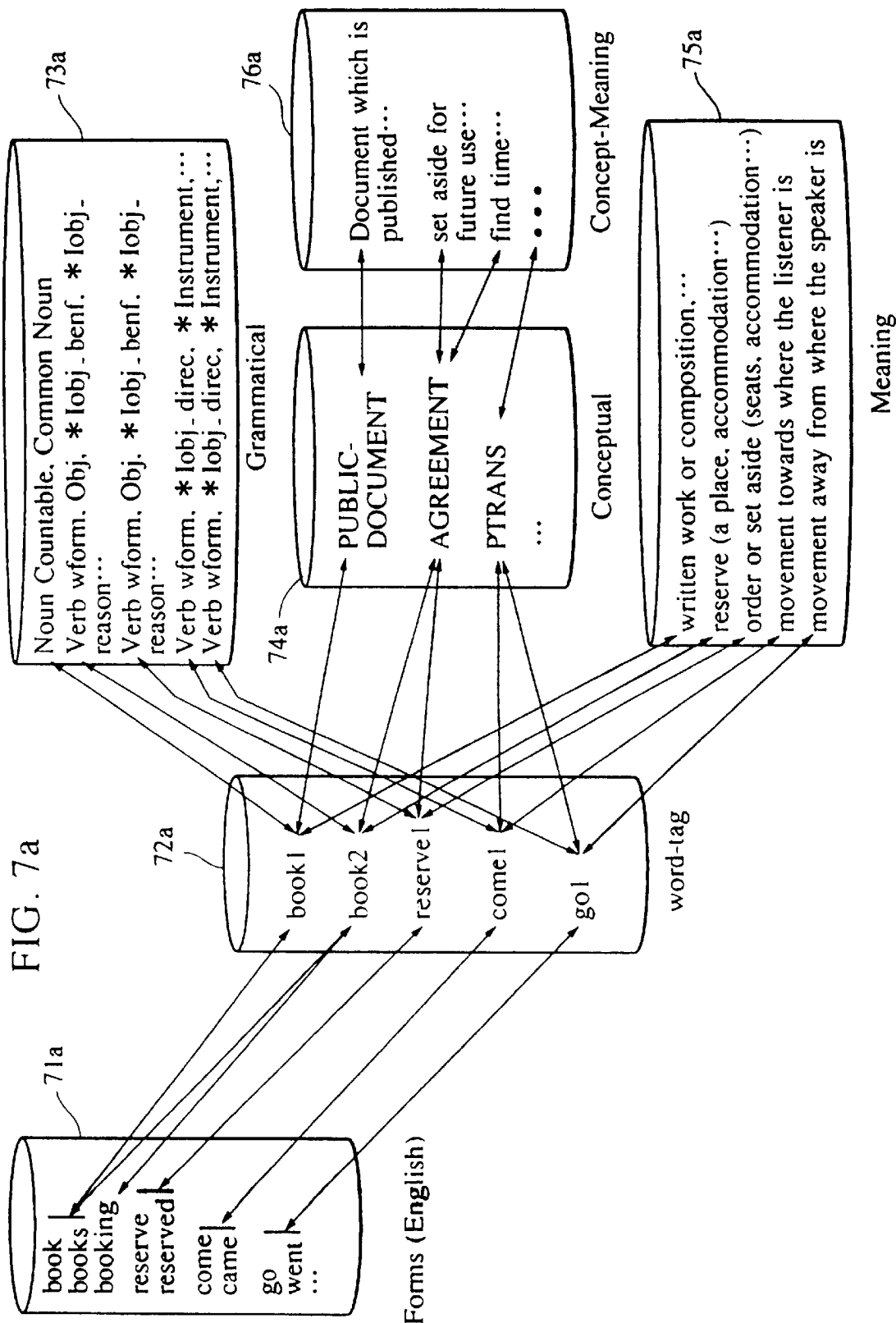

FIG. 8A

| Word | Word-tag | Form (other properties) |
|---|---|---|
| come | come1 | BASEFORM |
| comes | come1 | PRESTFORM |
| coming | come1 | PROGFORM |
| came | come1 | PASTFORM |
| go | go1 | BASEFORM |
| goes | go1 | PRESTFORM |
| going | go1 | PROGFORM |
| went | go1 | PASTFORM |
| gone | go1 | PARTFORM |
| book | book2 | BASEFORM |
| books | book2 | PRESTFORM |
| booking | book2 | PROGFORM |
| booked | book2 | PASTFORM |
| sent | send1 | BASEFORM |
| send | send1 | PASTFORM |
| get | get1 | BASEFORM |
| got | get1 | PASTFORM |
| get | get2 | BASEFORM |
| got | get2 | PASTFORM |
| get | get3 | BASEFORM |
| got | get3 | PASTFORM |
| reserve | reserve1 | BASEFORM |
| reserved | reserve2 | PASTFORM |
| work | work1 | BASEFORM |
| accept | accept1 | BASEFORM |
| agree | agree1 | BASEFORM |
| decline | decline1 | BASEFORM |
| discuss | discuss1 | BASEFORM |
| inform | inform1 | BASEFORM |
| travel | travel1 | BASEFORM |
| travelling | travel1 | PROGFORM-British |
| traveling | travel1 | PROGFORM-US |
| analyse | analyse1 | BASEFORM-British |
| analyze | analyse1 | BASEFORM-US |
| meet | meet1 | BASEFORM |
| visit | visit1 | BASEFORM |
| visit | visit2 | BASEFORM |
| ... | ... | ... |

| | | |
|---|---|---|
| book | book1 | SINGULAR |
| books | book1 | PLURAL |
| pen | pen1 | SINGULAR |
| pens | pen1 | PLURAL |
| pencil | pencil1 | SINGULAR |
| bencils | pencil1 | PLURAL |
| letter | letter1 | SINGULAR |
| letters | letter1 | PLURAL |
| ... | ... | ... |
| some | some1 | |
| every | every1 | |
| ... | ... | ... |
| i | i1 | SUBJECTIVE |
| me | i1 | OBJECTIVE |
| my | i1 | POSS_REL |
| mine | i1 | POSS_OBJ_REL |
| you | you1 | OBJECTIVE SECOND PERSON |
| ... | ... | |

FIG. 9A

| Wordtag | category | |
|---|---|---|
| come1 | verb | |
| go1 | verb | |
| send1 | verb | |
| get1 | verb | |
| get2 | verb | |
| get3 | verb | |
| book2 | verb | |
| reserve1 | verb | |
| accept1 | verb | |
| agree1 | verb | |
| decline1 | verb | |
| inform1 | verb | |
| discuss1 | verb | |
| work1 | verb | |
| meet1 | verb | |
| visit1 | verb | |
| visit2 | verb | |
| accommodate1 | verb | |
| book1 | noun | Countable, Neuter, Common_Noun |
| pen1 | noun | Countable, Neuter, Common_Noun |
| pencil1 | noun | Countable, Neuter, Common_Noun |
| workdomain1 | noun | UnCountable, Neuter |
| letter1 | noun | Countable, Neuter, Common_Noun |
| i1 | pronoun | First_Person, Singular, Common |
| we1 | pronoun | First_Person, Plural, Common |
| you1 | pronoun | Second_Person, Singular, Common |
| he1 | pronoun | Third_Person, Singular, Mas |
| she1 | pronoun | Third_Person, Singular, Fem |
| it1 | pronoun | Third_Person, Singular, Neuter |
| ... | | |

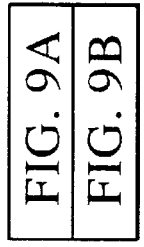

FIG. 9

| FIG. 9A |
|---|
| FIG. 9B |

FIG. 9B

| Position Information | Rules | Nounform |
|---|---|---|
| wform, *Iobj_direc, *From, *Iobj_reason, *Instrument, *Time | | |
| wform, *Iobj_direc, *From, *Iobj_reason, *Instrument, *Time | | |
| wform, Object, *Iobj_benf, *from, *Iobj_via, *Instrument, *Iobj_reason focus (Object) | | |
| wform, Iobj_benf, Object, *Iobj_via, *from, *Instrument, *Iobj_reason focus (Iobj) | | |
| wform, Object, *From, *Instrument, *Time | | |
| wform, Object, *From, *Instrument, *Time | | |
| wform, Object, *From, *Instrument, *Time | | |
| wform, Object, *Iobj_benf, *Iobj_reason, *Time | | |
| wform, Object, *Iobj_benf, *Iobj_reason, *Time | | |
| ... | | |
| ... | | |
| wform, *Object, *Instrument, *support, *Iobj_reason, *Time | | |
| wform, Iobj_benf, *Object, *Instrument, *Support, *Time | | |
| wform, *Object, *Instrument, *Support, *Time | | |
| wform, Object, *Support, *Iobj_reason, *Time | | discussion |
| wform, Object, *Support, *Iobj_reason, *Support, *Time | | |
| wform, Object, *Suppor, *Timet | | |
| wform, Object, *Suppor, *Time | | |
| wform, Object, *Time | | |
| name, wform, *contains | | |
| name, wform, *contains, *authors | authors=NIL | accommodation |
| wform, *Methodology, *Since | | |

FIG. 10

| word-tag | Concept & Conditions |
|---|---|
| come1 | PTRANS (Object-Nil, Iobj_direc-Vicinity of Listener's location, Instrument-Vehicle) [or] PTRANS (Object-Nil, Iobj_direc-Vicinity of Listener's location, Instrument-Vehicle) |
| go1 | PTRANS (Object-Nil, Iobj_direc-Place, From-Place, Instrument-Vehicle) |
| send1 | PTRANS (Object-Movable, Iobj_benf-Person, Iobj_via-Person, Instrument ≠ Actor, Iobj_direc Event of Building, instrument-Vehicle or Person or Action) |
| get1 | PTRANS (Object-MovablePhysicalObject, Iobj_benf-Actor, Instrument-Post, from ≠ Actor) |
| get2 | PTRANS (Object-MovablePhysicalObject, Iobj_benf-Actor, Instrument-Post, from ≠ Actor) |
| get3 | PTRANS (Object-MovablePhysicalObject, Iobj_benf-Actor, Instrument-Post, from ≠ Actor) |
| book2 | MTRANS (Object-MtransNoun or MbuildNounform or Mfeel or Action, Iobj_benf-Actor, Instrument-communication, from ≠ Actor) |
| reserve1 | AGREEMENT (Object-Ticket or Building or Accommodation, Instrument-Action or communication) |
| accept1 | AGREEMENT (Object-Ticket or Building or Accommodation, Instrument-Action or communication) |
| agree1 | AGREEMENT (Object-Action or Offer, Mode+ve···) |
| decline1 | AGREEMENT (Object-Action, rel-agreement) |
| inform1 | AGREEMENT (Object-Action or Offer, Mode-ve···) |
| discuss1 | MTRANS (Object-MtransNoun or MbuildNoun or MbuildNounform or Mfeel or Action, Iobj_benf-Person,Instrument-communication, from-Person) MTRANS (Object-MtransNoun or MbuildNoun or MbuildNounform or Mactobj or Action or SubMact, Iobj_benf-Person, Iobj_val-Nil, Instrument - communication, from-Nil, support-Building or Organization or Event) |
| work1 | WORK (Object-Work_domain or Project,···) |
| attend1 | MSENSE (Object-Event,···) |
| meet1 | MEET (Object-Person, Iobj_benf-Person,···) |
| visit1 | MEET (Object-Person,···) |
| visit2 | MSENSE (Object-Building,···) |
| accommodate1 | PCONFIG (Obj-Person, Actor-Physical Object, Support-Living Building) |
| book1 | PUBLIC-DOCUMENT (Published-Yes, Periodicity=nil···) |
| newspaper1 | PUBLIC-DOCUMENT (Published-Yes, Periodicity=Daily,···) |
| pen1 | WRITING-TOOL (Contains-Ink,···) |
| pencil1 | WRITING-TOOL (Contains-Graphite,···) |
| letter1 | PRIVATE-DOCUMENT (From-Person/Organization, Addressed to-Person/Organization, Written on-paper,···) |
| ··· | ··· |

FIG. 11

PUBLIC-DOCUMENT

| Slotname | |
|---|---|
| S1 | ⟨has a Name⟩ |
| S2 | ⟨is written by Authors who are Person(s)⟩ |
| S3 | ⟨contains Abstract Entity⟩ |
| S4 | ⟨is a published material⟩ |
| S5 | ⟨has a Price⟩ |
| S6 | ⟨is Published by an Organization⟩ |
| ο ο ο | ο ο ο |

FIG. 15

PHYSICAL OBJECT :

S1 <Name>
S2 <Function>
S3 <Abstract value>
S4 <Associated Abstract Entity>
S5 <Properties-(Countable, qualifiable by Adjectives, consummable resource, destructible...)>
S6 <Weight>
S7 <Dimensions>
...

FIG. 17

PERSON :

| | |
|---|---|
| S1 | < Name (FirstName Middle name Surname) > |
| S2 | < Age which is Number > |
| S3 | < Telephone Number > |
| S4 | < Date of Birth which is TIME > |
| S5 | < Address which is VENUE > |
| S6 | < Social Level > |
| S7 | < Belongs to which is ORGANIZATION > |
| S8 | < Performing which is WORK > |
| S9 | < Function which is Designation > |
| S10 | < Hobbies/Area of Interests > |
| S11 | < Parents which are of type Persons > |
| S12 | < Children which are of type Persons > |
| S13 | < Martial status > |
| S14 | < Male/Female > |
| ... | |

FIG. 18

Example of Person :

| | |
|---|---|
| S1 | (Kono Gitaro) |
| S2 | 38 |
| S3 | (+81-44-549-5454) |
| S4 | (15 Oct 1947) |
| S5 | (Yokohama, Nishi-Ku, Hiranuma 2-4-7) |
| S6 | 4 |
| S7 | (Canon R&D Headquarters) |
| S8 | (Compiler Design) |
| S9 | Senior Engineer |
| ... | |

FIG. 19

PERSON :

| | |
|---|---|
| S1 | NAME |
| S2 | |
| S3 | TIME |
| S4 | VENUE |
| S5 | |
| S6 | ORGANIZATION |
| S7 | WORK |
| S8 | |
| S9 | |
| S10 | PERSON |
| S11 | PERSON |
| S12 | |
| S13 | |
| S14 | |
| ... | |

FIG. 20

ABSTRACT ENTITY :

S1  <Name>
S2  <Function>
S3  <belongs to>
S4  <Associated Physical Object>
S5  <Properties-(Uncountable, qualifiable by
     Adjectives, consummable resource, Indestructible, controllable...)>
S6  <Contents>
S7  <Dimensions>
...

FIG. 22

ORGANIZATION :

| | |
|---|---|
| S1 | \<Name\> |
| S2 | \<Belongs to Higher parent Organization\> |
| S3 | \<Owns Suborganization(s) or Division(s)\> |
| S4 | \<Organization Type\> |
| S5 | \<Work Type\> |
| S6 | \<Work Domain\> |
| S7 | \<Address which is VENUE\> |
| S8 | \<has a Nominal head\> |
| S9 | \<has a Representative head\> |
| S10 | \<Phone Number\> |
| S11 | \<Fax Number\> |
| S12 | \<number of Persons working\> |
| ... | |

FIG. 23

Example of Organization :

| | |
|---|---|
| S1 | Canon R&D Headquarters |
| S2 | (Canon Inc. ) |
| S3 | (A&B Center, C&C Center, D&D Center) |
| S4 | Private |
| S5 | R&D |
| S6 | (Optics,...) |
| S7 | (Tokyo, Ohta-Ku, Shimomaruko 3-30-2) |
| S8 | Senior General Manager |
| S9 | Senior General Manager |
| S10 | (+81-03-3871-2111) |
| S11 | (+81-03-3871-3701) |
| S12 | 282 |
| ... | |

FIG. 24(a)

KNOWLEDGE DOMAIN :

| | |
|---|---|
| S1 | <Name> |
| S2 | <Owns Knowledge Domain> |
| S3 | <Belongs to Knowledge Domain> |
| S4 | <Books> |
| S5 | <Journals> |
| S6 | <Leading Research of Type Univ/Orgn.> |
| ... | |

FIG. 24(b)

Example

| | |
|---|---|
| S1 | Natural Language Processing |
| S2 | (Generation, Parsing, Understanding,...) |
| S3 | (Artificial Intelligence, Linguistics,...) |
| S4 | (...) |
| S5 | (AI Magazine, Cognitive Science,...) |
| S6 | ... |
| ... | |

FIG. 26(a)

PLACE :

| | |
|---|---|
| S1 | < Name > |
| S2 | < Owns Places > |
| S3 | < Belongs to Places > |
| S4 | < has Population > |
| S5 | < has Persons > |
| S6 | < occupies Area > |
| S7 | < Located at > |

FIG. 26(b)

COUNTRY :

| | |
|---|---|
| S1 | < Name > |
| S2 | < State > ⌈Owns⌋ |
| S3 | < Continent > ⌈Belongs to⌋ |
| S4 | < has Population > |
| S5 | < has Persons > |
| S6 | < occupies Area > |
| S7 | < Located at > |
| S8 | < Capital which is City > |

Example of Country :

FIG. 26(c)

City

| | |
|---|---|
| S1 | Japan |
| S2 | Tokyo, Osaka, Kanagawa, Hokkaido,... |
| S3 | Asia |
| S4 | (150 million) |
| S5 | ... |
| S6 | ... |
| S7 | ... |
| S8 | Tokyo |

FIG. 28(a)

UNIT TIME :

| | |
|---|---|
| S1 | \<Owns Unit Time\> |
| S2 | \<Belongs to Unit Time\> |
| S3 | \<Count\> |
| S4 | \<Qualifier\> |

FIG. 28(b)

TIME :

| | |
|---|---|
| S1 | \<has Second\> |
| S2 | \<has Minute\> |
| S3 | \<has Hour\> |
| S4 | \<has Day\> |
| S5 | \<has Day part\> |
| S6 | \<has Week\> |
| S7 | \<hasWeek part\> |
| S8 | \<has Month\> |
| S9 | \<has Month part\> |
| S10 | \<has Year\> |
| S11 | \<has Year part\> |
| S12 | \<has related event\> |

FIG. 29

ACTION/Results of Driving Forces

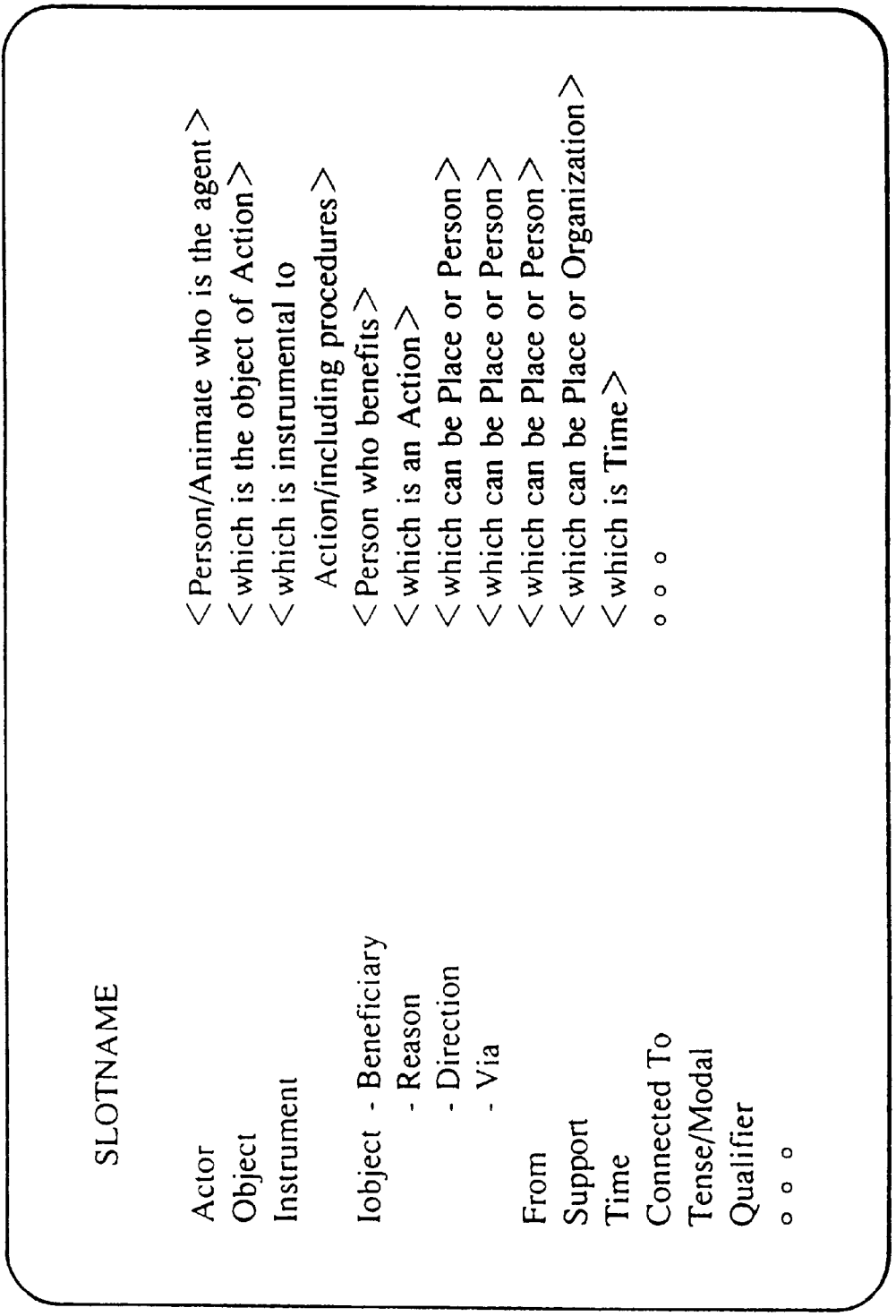

| SLOTNAME | |
|---|---|
| Actor | ⟨Person/Animate who is the agent⟩ |
| Object | ⟨which is the object of Action⟩ |
| Instrument | ⟨which is instrumental to Action/including procedures⟩ |
| Iobject - Beneficiary | ⟨Person who benefits⟩ |
| - Reason | ⟨which is an Action⟩ |
| - Direction | ⟨which can be Place or Person⟩ |
| - Via | ⟨which can be Place or Person⟩ |
| From | ⟨which can be Place or Person⟩ |
| Support | ⟨which can be Place or Organization⟩ |
| Time | ⟨which is Time⟩ |
| Connected To | ∘ ∘ ∘ |
| Tense/Modal | |
| Qualifier | |
| ∘ ∘ ∘ | |

FIG. 31

MEET

| SLOTNAME | |
|---|---|
| Actor | ⟨Person/Animate who is the agent⟩ |
| Object | ⟨Person who is the object⟩ |
| Instrument | |
| Iobject - Beneficiary | ⟨Person who benefits⟩ |
| - Reason | ⟨which is an Action⟩ |
| - Direction | nil |
| - Via | nil |
| From | |
| Support | ⟨which can be Place or Organization⟩ |
| Time | ⟨which is Time⟩ |
| Connected To | o o o |
| Tense/Modal | |
| Qualifier | |
| o o o | |

FIG. 32

MEET

| SLOTNAME | |
|---|---|
| Actor | PERSON |
| Object | PERSON |
| Instrument | |
| | |
| Iobject - Beneficiary | PERSON |
|     - Reason | ACTION |
|     - Direction | |
|     - Via | |
| | |
| From | PLACE/ORGANIZATION |
| Support | TIME |
| Time | |
| Connected To | |
| Tense/Modal | |
| Qualifier | |
| o o o | |

FIG. 34(a)

PTRANS

| SLOTNAME | |
|---|---|
| Actor | PERSON |
| Object | |
| Instrument | ACTION/VEHICLE |
| | |
| Iobject - Beneficiary | PERSON |
|      - Reason | ACTION |
|      - Direction | PERSON/PLACE |
|      - Via | PERSON/PLACE |
| From | PERSON/PLACE |
| Support | PLACE/ORGANIZATION |
| Time | TIME |
| Connected To | |
| Tense/Modal | |
| Qualifier | |
| o o o | |

Draft Instance of PTRANS

FIG. 34(b)

PTRANS

| SLOTNAME | |
|---|---|
| Actor | PERSON |
| Object | |
| Instrument | ACTION/VEHICLE |
| | |
| Iobject - Beneficiary | PERSON |
|      - Reason | ACTION |
|      - Direction | Vicinity of Listener's Location |
|      - Via | PERSON/PLACE |
| From | PERSON/PLACE |
| Support | PLACE/ORGANIZATION |
| Time | TIME |
| Connected To | |
| Tense/Modal | |
| Qualifier | |
| o o o | |

FIG. 35

MTRANS

| SLOTNAME | |
|---|---|
| Actor | ⟨Person/Animate who is the agent⟩ |
| Object | ⟨which can be Action or Object⟩ |
| Instrument | ⟨which is instrumental to Action/including procedures⟩ |
| Iobject - Beneficiary | ⟨Person who benefits⟩ |
|     - Reason | ⟨which is an Action⟩ |
|     - Direction | ⟨which can be Place or Person⟩ |
|     - Via | ⟨which can be Place or Person⟩ |
| From | ⟨which can be Place or Person⟩ |
| Support | ⟨which can be Place or Organization⟩ |
| Time | ⟨which is Time⟩ |
| Connected To | ○ ○ ○ |
| Tense/Modal | |
| Qualifier | |
| ○ ○ ○ | |

FIG. 36

MSENSE

SLOTNAME

Actor            ⟨Person/Animate who is the agent⟩
Object          ⟨which can be Action or Object⟩
Instrument     ⟨which is instrumental to Action/mode of Sensing⟩
Iobject - Beneficiary    ⟨Person who benefits⟩
       - Reason        ⟨which is an Action⟩
       - Direction     ⟨which can be Place or Person⟩
       - Via
From
Support
Time            ⟨which can be Place/Organization/Event⟩
Connected To    ⟨whith is Time⟩
Tense/Modal
Qualifier
o o o

FIG. 37

AGREEMENT

SLOTNAME

Actor            ⟨Person/Animate who is the agent⟩
Object           ⟨which can be Accommodation/Ticket...⟩
Instrument     ⟨which is instrumental to Action/Communication⟩
Iobject - Beneficiary    ⟨Person who benefits⟩
    - Reason        ⟨which is an Action⟩
    - Direction
    - Via           ⟨which can be Person⟩
From
Support
Time            ⟨which is Time⟩
Connected To
Tense/Modal
Qualifier
o o o           o o o

FIG. 39 a) INPUT : "I would like to meet you"

OUTPUT : WANT { Actor : PERSON (Aruna Rohra)

Object : MEET {

Actor : PERSON (Aruna Rohra)

Object : PERSON (John Smith)

...

Tense : Present form}

...

Tense : Future form

} b) INPUT : "I am coming to USA in April.     (1)

Hence I would like to meet you after 10th"     (2)

OUTPUT : PTRANS {···}     (for (1))

WANT {···

Object : MEET {···}}     (for (2))

⇩

OUTPUT_P : WANT {···

Object : MEET {···

Connected_to : (PTRANS {···}, REASON)}} c) INPUT : "reserve accommodation and pick up"

OUTPUT : AGREEMENT {Actor :

...

Connected_to : (MEET {···}, AND_REL)}

⇩

OUTPUT_P : AGREEMENT {···}

MEET {···}

FIG. 40

(a) John sent book to Mary (b) Subject (Agent-Person/Organization), Verb (Action/State Descriptor)

(c) John     Noun    PERSON (S1 (Name=John, S14 (Sex=Male))

(d) C1->PERSON (S1 (Name-John)

...

S14 (Sex-Male)
                   )

(e) Lc1->LingCon (Con-C1
                   PartofSpeech-Noun
                   ...)

(f) send     Verb     PTRANS (Object-OBJECT,
                               Instrument-Post or Vehicle...)

(g) C2->PTRANS (Actor-PERSON
                   Object-OBJECT
                   Iobj-benf-PERSON
                   ...)

(h) Lc2->LingCon (Con-C2
                   PartofSpeech-Verb
                   ...)

(i) Position Information1 -
        Actor(Person), Verb, Object(Object/Person), Iobj-benf(Person), Iobj-direc(Place)
   Position Information2 -
        Actor(Person), Verb, Iobj-benf(Person), Object(Object but not Person)

FIG. 41

(a) book Verb          AGREEMENT (Object-Room or Accommodation or Ticket...
                                           Iobj-benf-Person
                                           ...)

book Noun Singular    PUBLIC-DOCUMENT (b)     C3->PUBLIC-DOCUMENT

Lc3->LingCon (Con-C3

PartofSpeech-Noun

...)

(c)     to CASE-MARKER Preposition (d)     C4->CASE-MARKER (e)     Lc4->LingCon (Con-C4

PartofSpeech-PREPOSITION

...)

(f)     Mary    Noun     PERSON (Name-Mary, Sex-Female)

(g)        C5->PERSON (Name-Mary,...

Sex-Female).

...)

(h)        (Lc5->LingCon (Con-C5

PartofSpeech-Noun

C2-PTRANS (Actor C1
         Object C3
         Iobj-benf C5
         Iobj-Reason (ACTION)
         From (PLACE)
         Instrument (VEHICLE)
         Support (PLACE)
         Tense (past)
         ...)

where,

C1-PERSON (Name (John)
         Sex (Male)
         ...)

C3-PUBLIC-DOCUMENT (Count (Singular)...)

C5-PERSON (Name (Mary)
         Sex (Female)
         Caserole C4
         ...)

C4-CASEMARKER (role-BENEFICIARY)

FIG. 43(1)

What is the objective/purpose of your visit ?'

(a) 'to discuss on NLP systems...'
(b) 'The purpose of my visit is to discuss on NLP systems...'
(c) 'I would like to visit him to discuss on NLP systems...'

FIG. 43(2)

I want to write to John.

oops!, it is not John but actually meant to write to Mary.

(d) WANT (Actor-<user>
             Object-MTRANS (Actor-<user>
                            Object-
                            Iobj Benf-PERSON (name-Mary...)
                            ...)
             ...)

FIG. 44(1)

Input :

I would like to visit ...

(a) MEET (i.e., visit someone either socially or on business or for some other purpose)
(b) MSENSE (i.e., go or come to see a place, an institution etc.)

FIG. 44(2)

Continued Input :

(c) you for a week after 10th
    (d) Human Computer Interaction labs at your university.

FIG. 45

ADDRESS — COUNTRY — PREFECTURE — CITY — KU — CHO — CHOME — BANCHI

PLACE

FIG. 48

CITY

S1  <Name>
S2  <Ku>      ⌈Owns⌉
S3  <Prefecture> ⌈Belongs to⌉

FIG. 49

| CITY<br>市 | |
|---|---|
| S1 | Yokohama City<br>横浜市 |
| S2 | Tsurumi-ku, Kanagawa-ku, Nishi-ku, Naka-ku ···<br>鶴見区、 神奈川区、 西区、 中区、 ··· |
| S3 | Kanagawa Prefecture<br>神奈川県 |

FIG. 50

ADDRESS
S1 <Country>
S2 <Prefecture>
S3 <City>
S4 <Ku>
S5 <Cho>
S6 <Chome>
S7 <Banchi>

FIG. 52

PERSON :

S1 <Name FirstName Surname>
S2 <Father who is Person>
S3 <Mother who is Person>
S4 <Date of Birth which is TIME>
S5 <Family Register>

FIG. 53

ACTION/AD :

S1  <PERSON> who is the agent
S2  <> which is the Object
S3  <> which is the Iobject
S4  <ACTION> which is the Iobj Reason
S5  <PLACE> which is the From
S6  <ACTION> which is the Instrument
S7  <PLACE> which is the Support
S8  <TIME> which is the Time

FIG. 54

FAMILY REGISTER :

| | |
|---|---|
| S1 | \<Place\>which is Legal Domicile |
| S2 | \<Person\>who is the holder |
| S3 | \<ACTION\>which is the firstline |
| S4 | {\<Page\>} |

FIG. 55

PAGE :

| | |
|---|---|
| S1 | {\<BLOCK\>} |
| S2 | \<NUMBER\> |

FIG. 56

| BLOCK | |
|---|---|
| S1 | ⟨Person⟩ who is the owner |
| S2 | {⟨ACTION⟩} which is the Declaration |
| S3 | ⟨Relation⟩ (e.g., Husband, Wife) |
| S4 | ⟨Rank⟩ (e.g., First, Second, ····) |
| S5 | ⟨Sex⟩ (Female or Male) |
| S6 | ⟨Adopted⟩ |

FIG. 57

```
TIME :

昭和
    (1-64/1月20日)            <Era Name>
    平成
    (1-
    ...

年                        <Year Mark>
    月                        <Month Mark>
    (1-12)
    日                        <Day Mark>
    (1-31)
    午前、午後                 <DAY PART Mark>

PLACE :
    市                        <City Mark>
    都                        <Metropolis Mark>
    区                        <Ku Mark>
    ...

PERSON :
    父、母                    <Relative>

NUMBERS :
    一、壱                    <NUMBER (=1)>
    二、弐                    <NUMBER (=2)>
    ...
    十、拾                    <NUMBER (=10)>
    元                        <NUMBER (=1)>

OTHERS :
    に、から、で、...          <CASEMARKER>
    同                        <Pronoun 1>
```

FIG. 58

| | |
|---|---|
| 出生 | < Birth > |
| 届出 | < Declaration > |
| 死亡 | < Death > |
| 入籍 | < Entry in Family Register > |
| 戸籍 | < Family Register > |
| 除籍 | < Removal from Family Register > |
| 親族 | < Relative > |
| 送付 | < Forwarding > |

FIG. 59

GENERAL RULES :

⟨Time - Phrase⟩ :
  {⟨Year Era⟩⟨Month⟩}⟨Day⟩{⟨Daypart⟩⟨Hours⟩⟨Minutes⟩}

⟨Address - Phrase⟩ :
  {⟨Country⟩}{⟨Prefecture⟩} ⟨City⟩ {⟨Ku⟩} {⟨Cho⟩⟨Chome⟩⟨Banchi⟩}

⟨Person⟩ :
  ⟨Name⟩   or
  ⟨Relative⟩ or
  ⟨Relative⟩ ⟨Name⟩

DECLARATION TYPES :

1. BIRTH :
    <Time - Phrase><Address - Phrase><Casemarker><Birth>
    <Time - Phrase><Person><Declaration>{Diff birthplace}
    <Entry in Family Register>

Diff birth - place :
    <Time - Phrase><Person><Casemarker><Forwarding>

2. DEATH :
    <Time - Phrase><Address - Phrase><Casemarker>
    <Death><Time - Phrase><Relative><Person><Notice>
    <Removal from Family Register>

| 氏名 | 甲野 義太郎 | | 本籍 | 東京都中央区京橋一丁目十一番 |
|---|---|---|---|---|
| | | | | 昭和参拾六年壱月拾日編製 |
| | | | | |
| | | | | |
| | | | | |
| 長男 | 父 | 甲野 幸雄 | | 昭和九年六月弐拾日東京都中央区で出生同月弐拾五日父届出大番 |
| | 母 | 松子 | | |
| | 夫 | 義太郎 | | 昭和参拾六年壱月拾日乙野梅子と婚姻届出東京都中央区京橋一丁目十一番甲野幸雄戸籍から入籍 |
| | 生 出 | 昭和九年六月弐拾日 | | |
| 長女 | 父 | 乙野 忠治 | | 昭和拾年壱月八日京都市上京区で出生同月拾日父届出 |
| | 母 | 梅子 | | |
| | 妻 | 梅子 | | 昭和参拾六年壱月拾日甲野義太郎と婚姻届出京都市上京区小山沼町十八番地乙野忠治戸籍から入籍 |
| | 生 出 | 昭和拾年壱月八日 | | |
| 長女 | 父 | 甲野 義太郎 | | 昭和参拾六年拾月弐日東京都中央区で出生同月拾日父届出大番 |
| | 母 | 梅子 | | |
| | | 啓太郎 | | |
| | 生 出 | 昭和参拾六年拾月弐日 | | |

FIG. 62

<MTRANS1> :

S1 <Person1> who is Agent
S2 <EVENT1> which is Object
S3 <Person> who is the Iobject
S4 <Action> which is Iobj Reason
S5 <Place> which is From
S6 <Action> which is Instrument
S7 <Address1> which is Support
S8 <Time1> which is Time <EVENT1> :

S1 <Block Owner> who is Agent
S2 <Concept> which is Object
S3 <Person> who is the Iobject
S4 <Action> which is Iobj Reason
S5 <Place> which is From
S6 <Action> which is Instrument
S7 <Address2> which is Support
S8 <Time2> which is Time <ADDRESS1> :

S1 <Country>
S2 <Prefecture>
S3 <City>
S4 <Ku>
S5 <Cho>
S6 <Chome>
S7 <Banchi>

<ADDRESS2> :

S1 <Country>
S2 <Prefecture>
S3 <City>
S4 <Ku>
S5 <Cho>
S6 <Chome>
S7 <Banchi>

<TIME1> :

S1 <Year Era>
S2 <Month>
S3 <Day>
S4 <Day part>
S5 <Hours>
S6 <Minutes>

<TIME2> :

S1 <Year Era>
S2 <Month>
S3 <Day>
S4 <Day part>
S5 <Hours>
S6 <Minutes>

FIG. 63

<MTRANS1> :

S1  Father who is Agent
S2  <BIRTHCD1>which is Object
S3  <Person>who is the Iobject
S4  <Action>which is Iobj Reason
S5  <Place>which is From
S6  <Action>which is Instrument
S7  <Address1>which is Support
S8  <Time1>which is Time <BIRTHCD1> :

S1  <Block Owner>who is Agent
S2  <Concept>which is Object
S3  <Person>who is the Iobject
S4  <Action>which is Iobj Reason
S5  <Place>which is From
S6  <Action>which is Instrument
S7  <Address2>which is Support
S8  <Time2>which is Time <ADDRESS1> :

S1  <Country>
S2  <Prefecture>
S3  Yokohama City
S4  Tsurumi-Ku
S5  <Cho>
S6  <Chome>
S7  <Banchi>

<ADDRESS2> :

S1  <Country>
S2  <Prefecture>
S3  Yokohama City
S4  Tsurumi-Ku
S5  <Cho>
S6  <Chome>
S7  <Banchi>

<TIME1> :

S1  [Year=1 Era=Heisei]
S2  [Month=1]
S3  [Day=29]
S4  <Day part>
S5  <Hours>
S6  <Minutes>

<TIME2> :

S1  [Year=1 Era=Heisei]
S2  [Month=1]
S3  [Day=27]
S4  <Day part>
S5  <Hours>
S6  <Minutes>

NATURAL LANGUAGE PROCESSING SYSTEM AND METHOD FOR PROCESSING INPUT INFORMATION BY PREDICTING KIND THEREOF

BACKGROUND OF THE INVENTION

1. Field of the Invention

The present invention relates to a natural language processing system for performing natural language processing on the basis of information inputted thereto in a natural language and further relates to a method therefor.

2. Description of the Related Art

Hitherto, a system for processing a predetermined keyword and a system for performing syntactic analysis and semantic analysis on a text have been devised to process input information represented in a natural language.

However, among these conventional systems, in the system using predetermined keywords, a very large number of keywords are necessary to realize a practical system.

Further, in the system for performing syntactic analysis and semantic analysis on a text, even when this system is provided with a grammar and a considerably large dictionary, it is very difficult to uniquely determine the semantic role of each portion of the analyzed text and to decompose or partition a sequence of nouns into groups thereof. This is a serious problem, in the case where the text is represented in a language such as Japanese and modern Hindi, in which a verb is positioned at the end of a sentence. Moreover, in the case of the conventional system for performing syntactic analysis, it is difficult to process input information if the information is an incomplete sentence.

Therefore, extraction of useful data from the contents of natural language input information concerning a specific field, which is an easy task for a human being, can not be easily achieved by using the conventional machine.

SUMMARY OF THE INVENTION

Accordingly, an object of the present invention is to provide a natural-language processing system which can process an incomplete sentence as input information, without performing syntactic analysis.

Further, another object of the present invention is to provide a natural-language processing method, by which an incomplete sentence can be processed as input information without performing syntactic analysis.

Moreover, still another object of the present invention is to provide a natural-language processing system which can eliminate ambiguity in information by expecting a kind of subsequent information.

Furthermore, yet another object of the present invention is to provide a natural-language processing method, by which ambiguity in information can be eliminated by expecting a kind of subsequent information.

To achieve the foregoing object, in accordance with an aspect of the present invention, there is provided a natural language processing system comprising, input means for inputting information represented in a natural language, a knowledge base for storing linguistic knowledge and general knowledge, partition means for partitioning the information, which is inputted by the input means, into words, derivation means for referring to knowledge stored in the knowledge base and for deriving concepts respectively represented by the words obtained by the partition means, and integration means for relating the concepts of the words, which are derived by the derivation means, with one another by referring to knowledge stored in the knowledge base.

Further, in accordance with another aspect of the present invention, there is provided a natural language processing system comprising, input means for inputting information represented in a natural language, a knowledge base for storing therein linguistic knowledge and knowledge concerning a domain of information to be processed, expectation means for expecting a kind of information to be inputted from the input means, on the basis of the knowledge stored in the knowledge base, and processing means for processing information whose kind is expected by the expectation means.

Moreover, in accordance with still another aspect of the present invention, there is provided a natural language processing system comprising, input means for inputting information represented in a natural language, a knowledge base for storing therein knowledge concerning a domain of information to be processed, general knowledge and linguistic knowledge, expectation means for expecting a kind of information to be inputted by the input means, on the basis of the knowledge stored in the knowledge base, expectation information storing means for storing a result of an expectation made by the expectation means, as expectation information, and analysis means for analyzing information inputted from the input means by referring to the expectation information stored in the expectation information storing means and to the knowledge stored in the knowledge base.

Furthermore, in accordance with yet another aspect of the present invention, there is provided a natural language processing method comprising, the input step of inputting information in a natural language, the partition step of partitioning the information inputted in the input step, the derivation step of referring to knowledge stored in a knowledge base, which stores linguistic knowledge and general knowledge, and deriving concepts represented by the words obtained in the partition step, and the integration step of relating the concepts, which are derived respectively correspondingly to the words in the derivation step, with one another by referring to the knowledge stored in the knowledge base.

Additionally, in accordance with a further aspect of the present invention, there is provided a natural language processing method comprising, the input step of inputting information in a natural language, the expectation step of expecting the kind of information inputted in the input step on the basis of knowledge stored in the knowledge base, which stores therein linguistic knowledge and knowledge concerning the field of information to be processed, and the step of processing the information whose kind is expected in the expectation step.

Further, in accordance with still further aspect of the present invention, there is provided a natural language processing method comprising, the input step of inputting information in a natural language, the expectation step of expecting the kind of information inputted in the input step on the basis of knowledge stored in the knowledge base, which stores therein knowledge concerning a domain of information to be processed, general knowledge and linguistic knowledge, the expectation information storing step of storing information, which represents a result of an expectation made in the expectation step, in an expectation information memory as expectation information, and the analysis step of analyzing the information inputted in the input step by referring to the expectation information stored in the expectation information memory and the knowledge stored in the knowledge base.

Other features, objects and advantages of the present invention will become apparent from the following description of a preferred embodiment with reference to -the drawings in which like reference characters designate like or corresponding parts throughout several views.

BRIEF DESCRIPTION OF THE DRAWINGS

FIGS. 7a and 7b are block diagrams which illustrate the configurations of English Linguistic Knowledge Base (LKB) and Japanese LKB, respectively;

FIG. 9, which consists of FIGS. 9A and 9B, is a diagram for illustrating the structure of a grammar dictionary;

FIG. 10 is a diagram for illustrating the structure of a conceptual dictionary;

FIG. 11 is a diagram for illustrating the structure of "Public Document";

FIG. 15 is a diagram for illustrating an example of the knowledge structure of a physical object;

FIG. 17 is a diagram for illustrating the knowledge structure of a person;

FIG. 18 is a diagram for illustrating an example of the knowledge structure of the person;

FIG. 19 is a diagram for illustrating an example of a draft instance of person;

FIG. 20 is a diagram for illustrating the knowledge structure of an abstract entity;

FIG. 22 is a diagram for illustrating the knowledge structure of an organization;

FIG. 23 is a diagram for illustrating an example of the knowledge structure of the organization;

FIG. 24 is a diagram for illustrating the knowledge structure of a knowledge domain and an example thereof;

FIG. 26 is a diagram for illustrating the knowledge structures of a place and a country and an example thereof;

FIG. 28 is a diagram for illustrating the knowledge structures of the unit time and a time;

FIG. 29 is a diagram for illustrating the knowledge structure of an action;

FIG. 31 is a diagram for illustrating the knowledge structure of MEET;

FIG. 32 is a diagram for illustrating the draft instance of the MEET;

FIG. 34a is a diagram for illustrating the draft instance of the PTRANS;

FIG. 34b is a diagram for illustrating the draft instance of PTRANS for the verb "come";

FIG. 35 is a diagram for illustrating the knowledge structure of MTRANS;

FIG. 36 is a diagram for illustrating the knowledge structure of MSENSE;

FIG. 37 is a diagram for illustrating the knowledge structure of AGREEMENT;

FIG. 39, which has parts 39a, 39b and 39c, are diagrams for illustrating objects and results of a processing to be performed by the post-CA;

FIGS. 40, which has parts 40a to 40i, 41, which has parts 41a to 41h, 42, which consists of FIGS. 42(1) and 42(2), 43 and 44, which consists of FIGS. 44(1) and 44(2), are practical examples of input information, information on processes and results of a processing by CA;

FIG. 45 is a diagram for illustrating elements which belong to the place;

FIG. 48 is a diagram for illustrating the knowledge structure of the city;

FIG. 49 is a diagram for illustrating the representation of YOKOHAMA city;

FIG. 50 is a diagram for illustrating the general knowledge structure of an address;

FIG. 52 is a diagram for illustrating the knowledge structure of the person;

FIG. 53 is a diagram for illustrating the knowledge structure of the action;

FIG. 54 is a diagram for illustrating the knowledge structure of a family register;

FIG. 55 is a diagram for illustrating the knowledge structure of a page of the family register;

FIG. 56 is a diagram for illustrating the knowledge structure of a block of the family register;

FIG. 57 is a diagram for illustrating an example of a general dictionary;

FIG. 58 is a diagram for illustrating an example of a dictionary of the field of the family register;

FIG. 59 is a diagram for illustrating an example of a general description rules;

FIG. 60 is a diagram for illustrating example rules for description in the field of the family register;

FIG. 61 is a diagram for illustrating an example of read/input family register information;

FIG. 62 is a diagram for illustrating the structure of the initialized family register information; and FIG. 63 is a diagram for illustrating the structure of analyzed family register information.

DETAILED DESCRIPTION OF THE PREFERRED EMBODIMENTS

Hereinafter, the preferred embodiment of the present invention will be described in detail by referring to the accompanying drawings.

Figure 1:
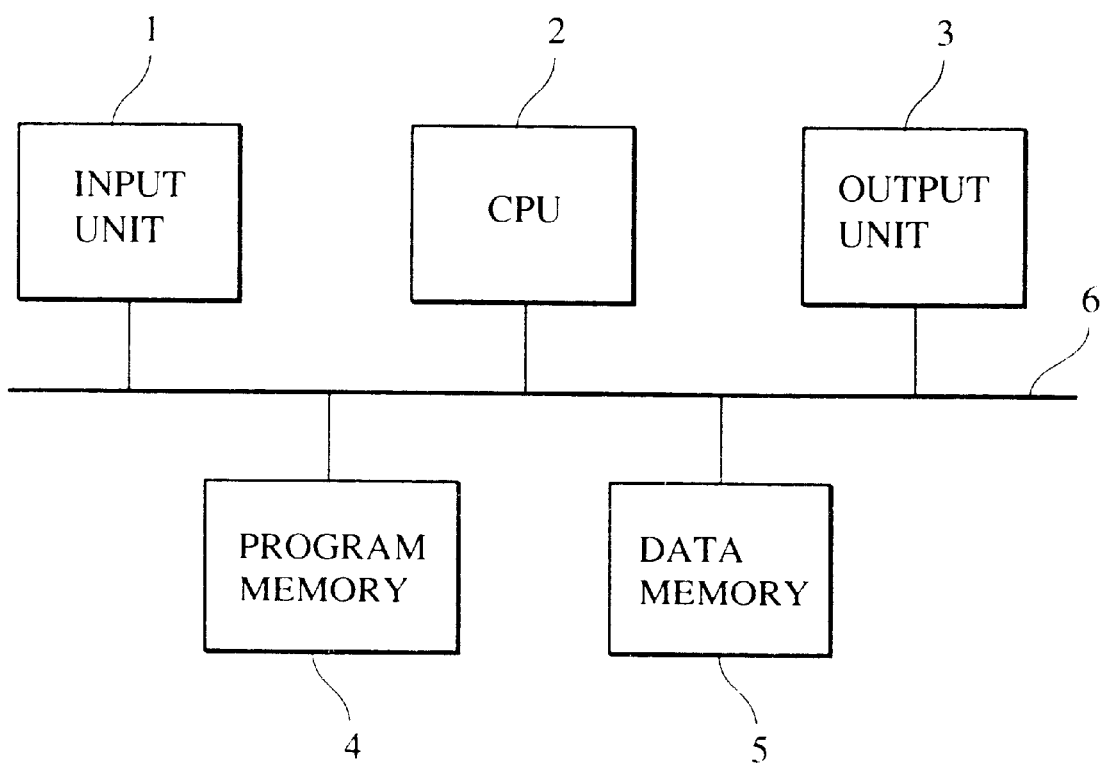
FIG. 1 is a block diagram for illustrating the configuration of the hardware of a natural language processing system, embodying the present invention, namely, the embodiment of the present invention.

FIG. 1 is a block diagram for illustrating the configuration of the hardware of a natural language processing system embodying the present invention, namely, the embodiment of the present invention.

In this figure, reference numeral 1 designates an input unit for inputting information. In the following description, this input information will be referred to as a text. This system is, however, also able to process a grammatically incomplete or erroneous sentences. Reference numeral 2 denotes a central processing unit (CPU) which is operative to perform operations for various processing and make a logical decision or the like and further controls each composing element connected to a bus 6. Further, reference numeral 3 designates an output unit for outputting information.

Reference numeral 4 denotes a program memory, namely, a memory for storing therein programs to be executed by the CPU 2 so as to perform control operations including a procedure to be described later by referring to a flowchart thereof. Either of a read-only memory (ROM) and a random access memory (RAM), to which a program is loaded from an external memory unit or the like, may be employed as the program memory 4.

Reference numeral 5 designates a data memory which stores knowledge contained in a knowledge base (to be described later) in addition to data generated when performing various kinds of processing. The data memory is, for example, a RAM. Knowledge contained in the knowledge base is loaded from a nonvolatile external storage medium into the data memory 5 before the processing is performed. Alternatively, the knowledge contained in the knowledge base is referred to each time when such knowledge becomes necessary.

Reference numeral 6 denotes a bus used to transfer an address signal indicating a composing element to be controlled by the CPU 2, a control signal used for controlling each composing element and data to be exchanged between the composing equipments.

Figure 2:
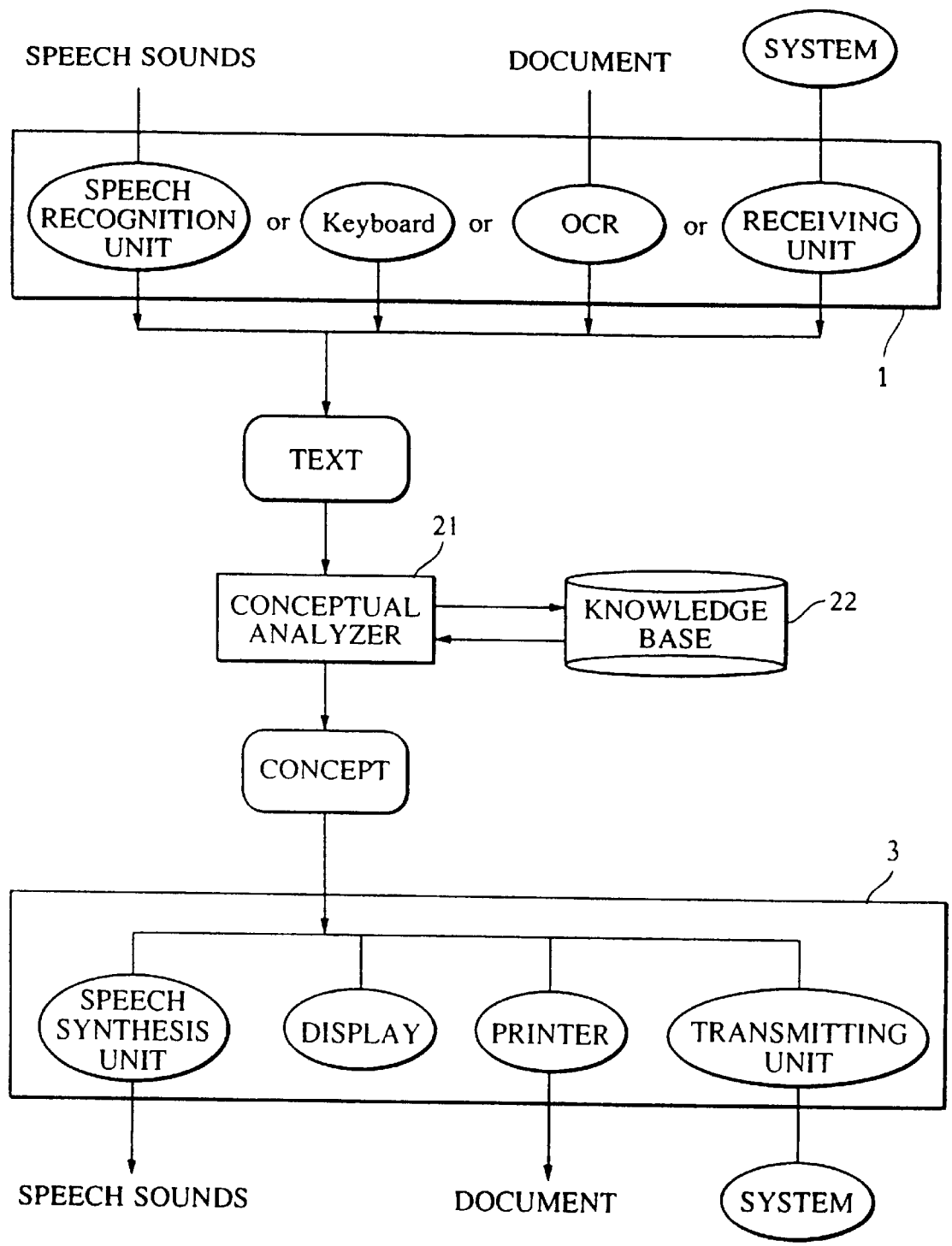
FIG. 2 is a functional block diagram for illustrating the fundamental configuration of the natural language processing system embodying the present invention.

FIG. 2 is a functional block diagram for illustrating the fundamental configuration of the natural language processing system embodying the present invention.

The input unit 1 of this figure is a unit used to input information represented in a natural language. For example, a keyboard for keying characters, a speech or voice recognition device for inputting and recognizing speech sounds, a character recognition device for optically reading characters from a document and recognizing the characters, and a receiver for receiving information from other systems, or the like may be employed as the input unit 1. Further, information generated by performing another operation in this processing system may also be used as input information thereto. Moreover, two or more of these devices may be simultaneously employed as the input unit, and one of the employed devices may be selected in such a manner as to be currently used as the input unit.

CA 21 is operative to refer to the knowledge contained in the knowledge base 22 and extract a concept described in a natural language text, which is inputted by the input unit 1, thereto. The details of the CA 21 will be described later.

An output unit 3 is used to output data obtained from the CA 21. For example, a speech synthesis device for synthesizing speech sounds from character information, a display device such as a cathode-ray-tube (CRT) display and a liquid crystal display, a printer for providing printouts, or a transmitter for transmitting information to other systems may be employed as the output unit 3.

Further, an output of the output unit may be used as input information to another portion of this system. Alternatively, two or more of these devices may be simultaneously employed as the output unit, and one of the employed units may be selected in such a manner as to be currently used as the output unit.

Figure 3:
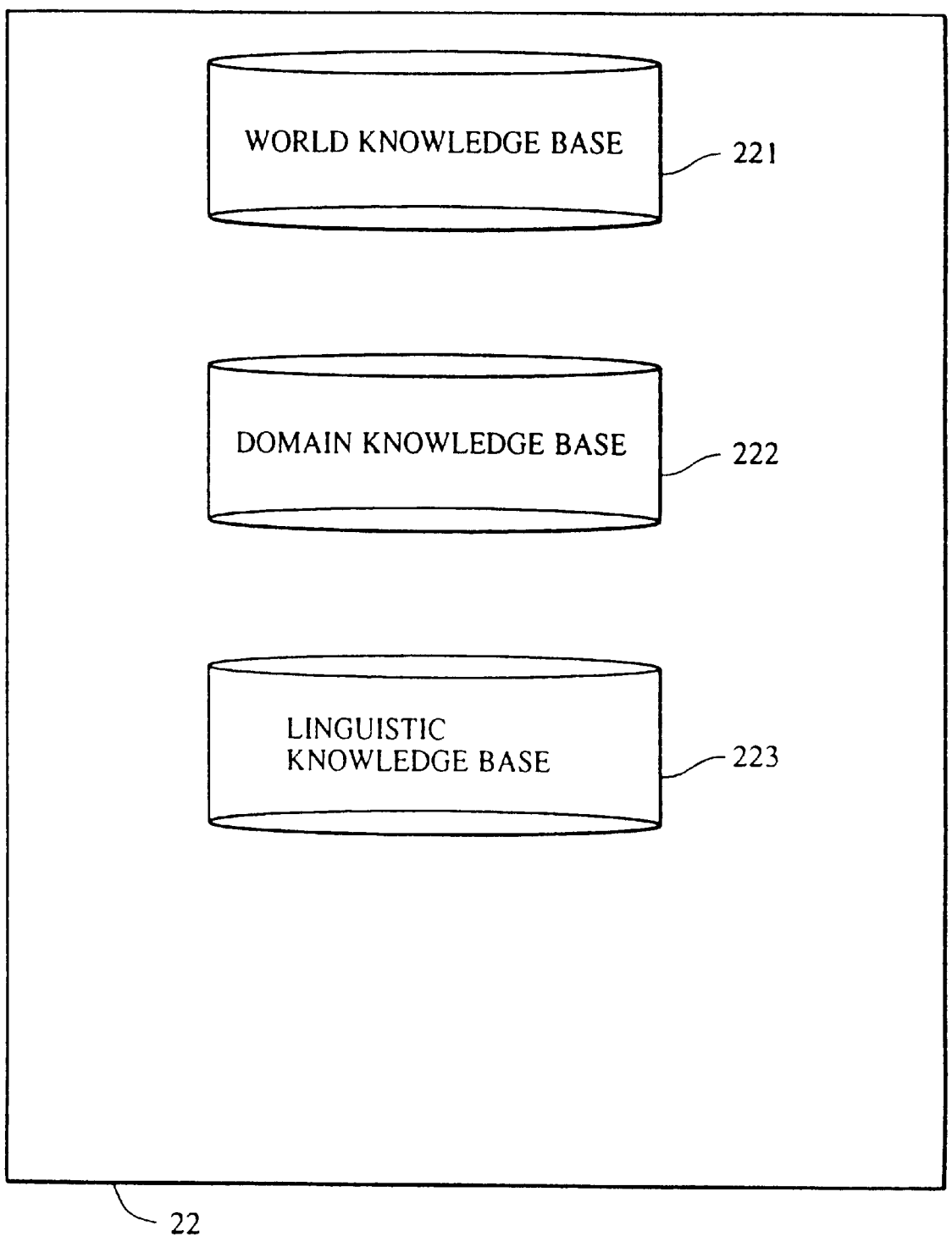
FIG. 3 is a diagram for illustrating the detailed configuration of a knowledge base.

FIG. 3 is a diagram for illustrating the detailed contents of a knowledge base 22. Reference numeral 221 designates a world knowledge base (WKB) which has general knowledge such as knowledge concerning the structure of a "PLACE"; 222 a domain knowledge base (DKB) which has knowledge particular to a field of an object to be processed; and 223 an LKB which has linguistic information such as knowledge concerning parts of speech and a grammar.

The aforementioned CA 21 analyzes natural language information inputted by a user and converts this information to concepts which represent the meaning of this information. The CA 21 obtains a semantic concept equivalent to input information therefrom and performs a processing on the basis of the semantic concept instead of first performing a syntactic analysis on the inputted natural language information and then giving meaning to the analyzed structure of a sentence as in the case of a conventional sentence analyzer. Further, the CA 21 performs a processing by expecting subsequent information from preceding information contextually, semantically and grammatically.

In the CA 21, when processing input information, the emphasis is put on the meaning thereof instead of generating the construction of a sentence by performing a syntactic analysis or parsing. Thereby, this system can handle even a grammatically erroneous statement and an incomplete sentence such as a piece of a statement. The CA 31 expects the subsequent word in the process of processing each word so as to make good use of the expected subsequent word in the subsequent process.

In the case of a conceptual analysis approach, a dictionary of the meaning of words plays a central role in the processing. Thus, the CA 21 does not utilize any definite grammar. The CA 21, however, does not completely dispense with utilization of constructive characteristics. Namely, the CA 21 utilizes a noun group constituency when a term having a meaning is constituted by a plurality of words.

Figure 4:
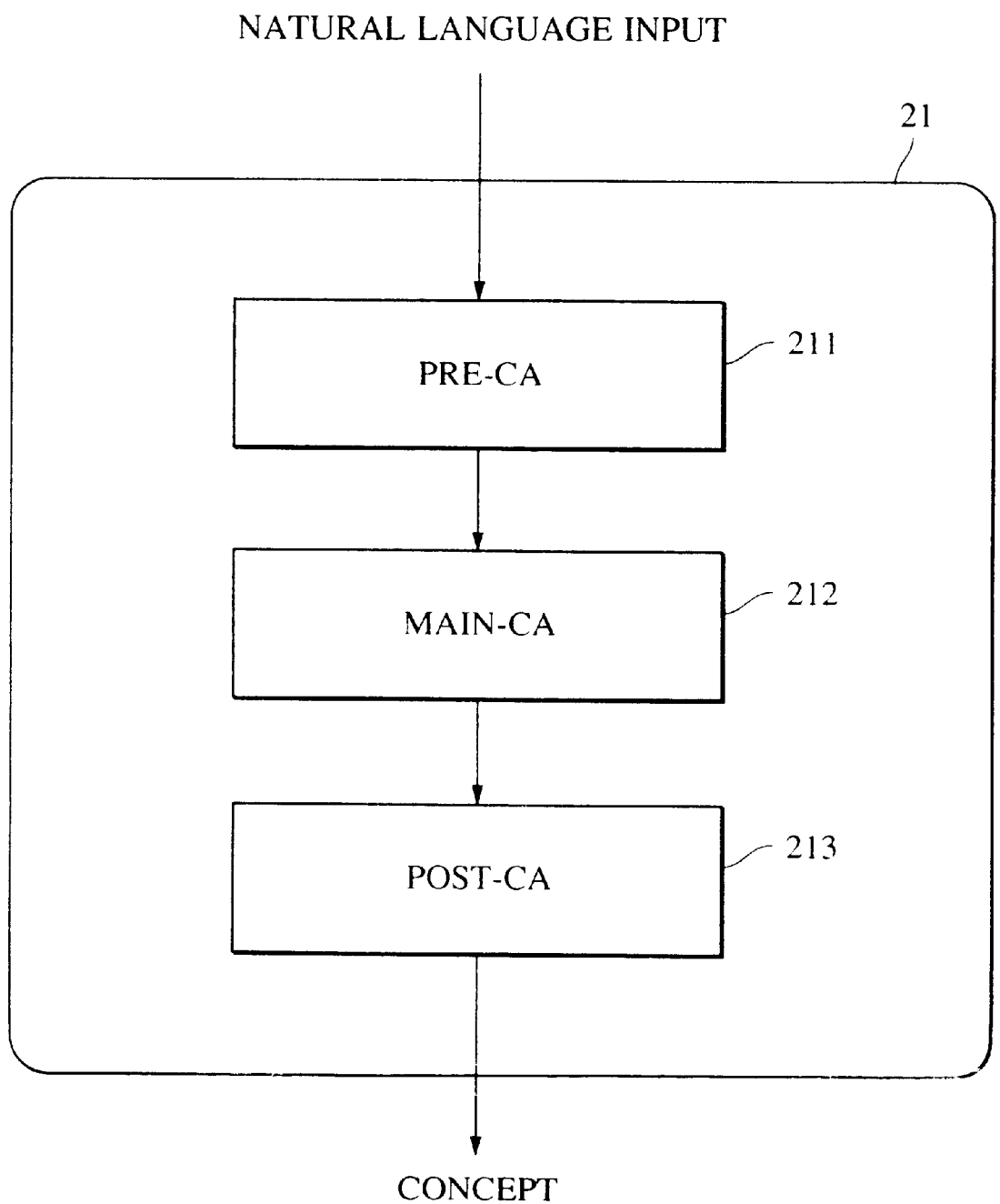
FIG. 4 is a diagram for illustrating the detailed configuration of a conceptual analyzer.

FIG. 4 is a diagram for illustrating the detailed configuration of the CA 21. Here, a pre-CA 211 is operative to perform a pre-processing which will be described later by referring to FIG. 5. A main CA 212 is operative to perform a main processing (to be described later by-referring to FIGS. 5 and 6) on each input word. Furthermore, a post-CA 213 is operative to perform a post-processing which will be described later by referring to FIGS. 38 and 39.

The CA 21 utilizes a expectation list, a word list, a C-list and a request list so as to effectively process input information.

The expectation list referred to hereafter as "ELIST", is a list in which expectation a concerning the next concept/word is maintained.

The word list referred to hereafter as "WLIST", is a list in which the meaning of all words, a REQUEST representing the mutual relation between preceding and subsequent words and word information containing an instance is maintained.

The C-list is a list in which word-related linguistic concepts containing both of linguistic and conceptual information about words is maintained.

The request list referred to hereafter as "RLIST", is a list in which requests which are active for each concept are maintained.

Figure 5:
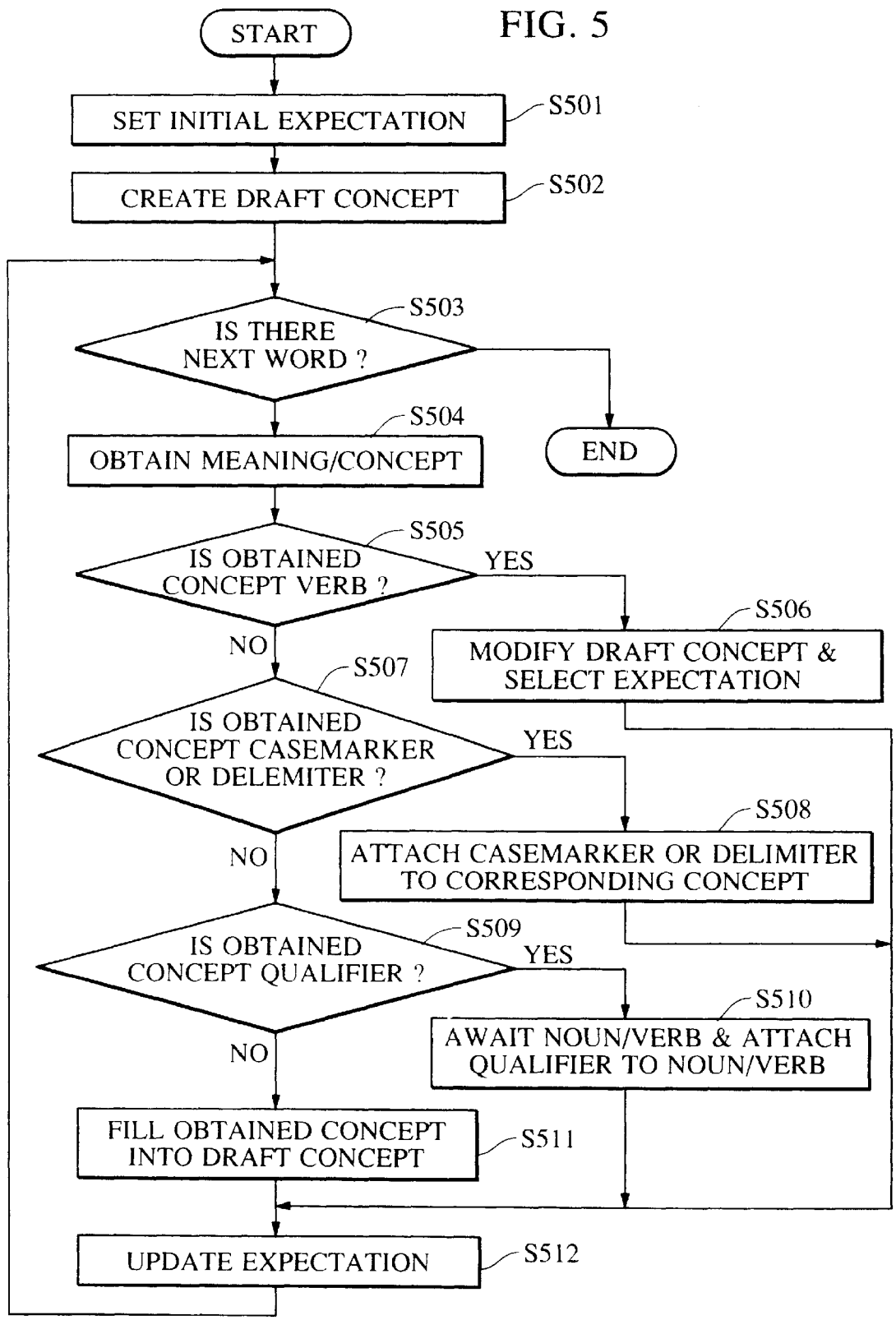
FIG. 5 is a flowchart for illustrating an analysis process.

FIG. 5 is a flowchart for illustrating a procedure by which the CA 21 performs the processing.

A process consisting of steps S501 and S502 is performed by the pre-CA 211. Further, another process consisting of steps S503 to S512 is performed by the main CA 212.

First, in step S501, initial expectation information is determined about the next input word. This is a primary processing to be performed by the pre-CA 211 on the basis of the grammar of the language, the meaning of words and the context (for instance, an answer presumed from a question in a colloquy).

For example, in the case where input information is represented in English and in the active voice, the structure of a sentence is grammatically restricted as follows:

Subject—Verb—Object.

The structure of the sentence is further restricted owing to the meaning thereof as follows:

Subject (Actor or Entity)—Verb (Action or State Descriptor)—Object where an actor may be a person, an organization or the like. The knowledge structures of a person and an action are shown in FIGS. 17 and 29, respectively. Further, the expectation can be set or modified on the basis of the context.

In step S502, the draft instance of the expected concept of the sentence is created. As described above, an input to the CA 21 is a set of natural language words. The CA 21 performs the processing (to be described later) on each of all of the words inputted thereto.

In step S503, it is judged whether an unprocessed next word exists. If not, the processing is terminated. If next word exists, the concept corresponding to that the word is obtained in step S504. Then, in step S505, it is checked, whether this concept is a verb. If so, the concept of the sentence is modified and the expectation about the next word is selected in step S506. In step S512, the expected information is updated and the program returns to step S503. If it is found in step S505 that the obtained concept is not a verb, it is further checked in step S507 whether or not the obtained concept is a casemarker, such as a particle, for prescribing the case structure or a delimiter for separating individual items. If the obtained concept is a casemarker or a delimiter, this casemarker or delimiter is attached before or after the concept in step S508. Then, the program returns to step S503 via step S512 as before. If it is found in step S507 that the obtained concept is neither a casemarker nor a delimiter, it is further checked in step S509 whether or not the obtained concept is a qualifier. If so, the concept waits until it finds the appropriate concept (noun/verb) to attached itself to, and is then attached to that concept in step S510. Subsequently, the programs returns to step S503 after following the step S512. If it is found in step S509 that the obtained concept is not a qualifier, this concept is filled into the draft concept of the statement. Then, the expected information is updated in step S512 and the program returns to step S503 to process any remaining words.

Figure 6:
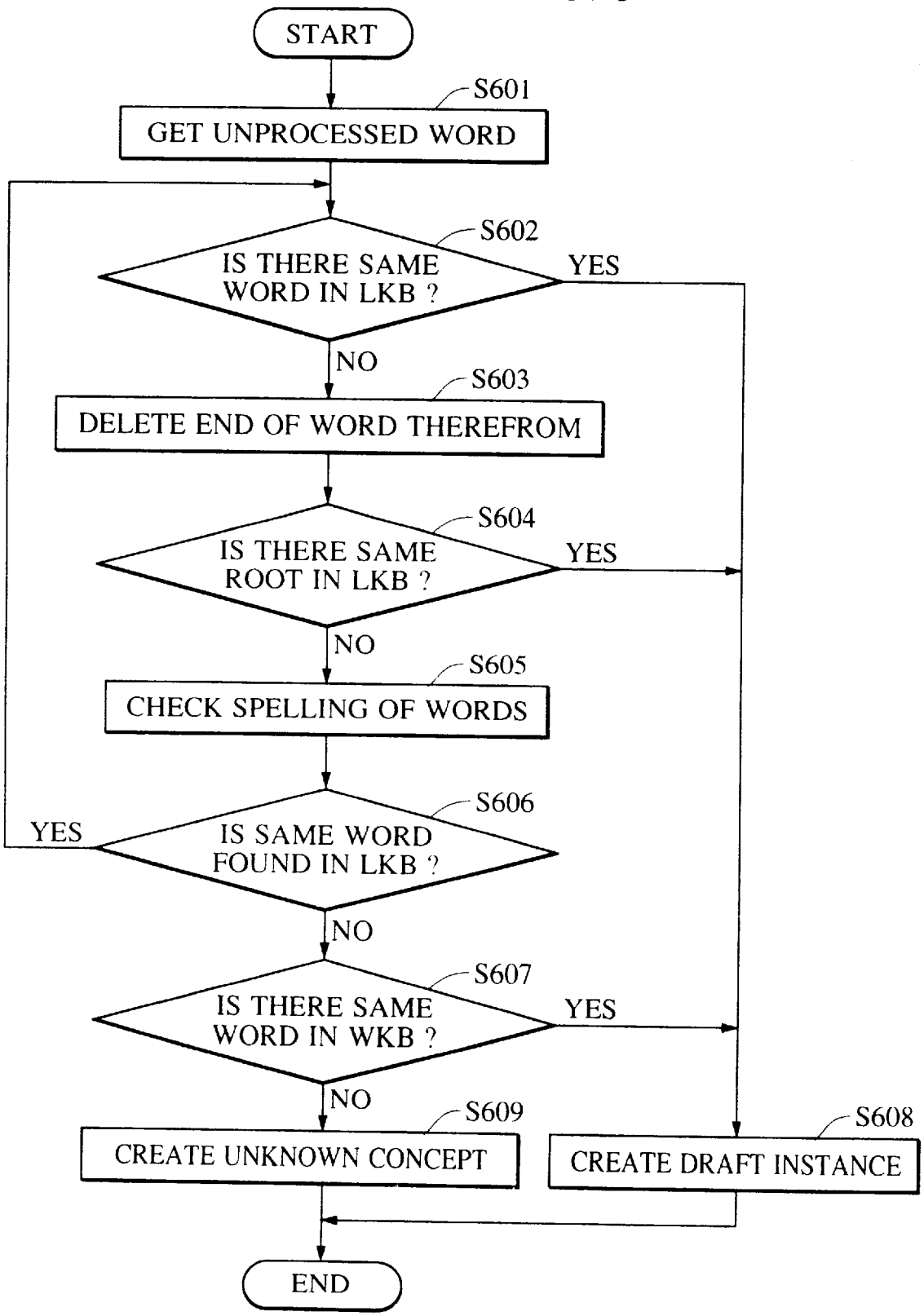
FIG. 6 is a detailed flowchart for illustrating a process of obtaining the meaning/concept of a word.

FIG. 6 is a detailed flowchart for illustrating the processing to be performed in step S504, namely, the process of obtaining the meaning/concept of the word.

First, in step S601, the next unprocessed word is obtained. Incidentally, in the case where words are not explicitly separated in a statement as in the case of Japanese, it becomes necessary to partition an input statement in word units. This is, however, unnecessary in the case where there is a space between words in a statement as in the case of English. Further, this partitioning process is performed as a part of this step or prior to it.

Next, in step S602, the LKB 233 is searched. If there exists a word same as the word to be processed, the program advances to step S608. However, if the word is not found in the LKB 233, the program advances to step S603 whereupon the ending of the word to be processed (-ed, -ings, -s or the like in the case of English) is deleted according to wordform rules. Then, the LKB is searched for the same word as the obtained word (which is called a "root"). If that word exists, the program advances to step S608. Conversely, in the case where the word is not found in the LKB, the program advances to step S605 whereupon the spelling of the word is checked by a word corrector (not shown) and the user's misspelling is corrected. Thereafter, the program returns to step S602 whereupon the LKB 233 is searched again for the word obtained by the correction. However, if the same word is not found, or if there is no possible spelling error found in step S605, the program advances to step S607. In this step S607, the WKB 231 is searched for the same word. If the word is found therein, the program advances to step S608. However, if it is not found, the program advances to step S609.

In step S608, a draft instance is created for the concept corresponding to the word being processed, from a given word rule. Thus the program is finished. The draft instance is the instance of the knowledge structure. Further, all of slots of this structure are filled with empty instances of entities which can possibly fill the slots.

In step S609, an "unknown concept" is created. Then, the program is finished.

Figure 7B:
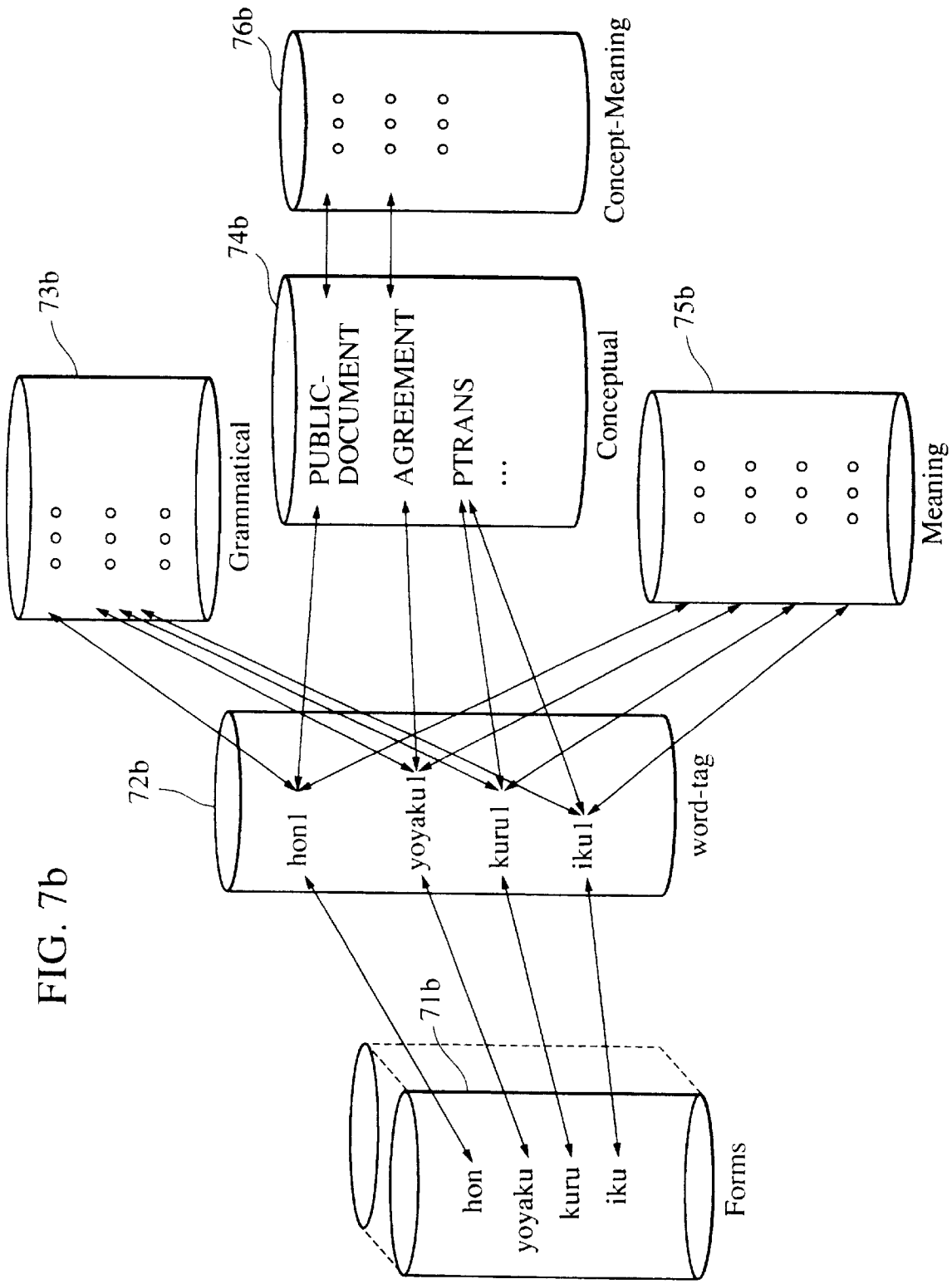

FIGS. 7a and 7b are block diagrams which illustrate the configurations of English Linguistic Knowledge Base (LKB) and Japanese LKB, respectively.

Reference characters 71a and 71b are form dictionaries which store groups of words represented in various forms appearing in a natural language text therein respectively corresponding to the languages. Further, reference characters 72a and 72b are word-tag dictionaries in which one word-tag corresponds to one meaning of each word. Reference characters 73a and 73b are grammar dictionaries in which grammatical information concerning each word is described. Reference characters 74a and 74b are conceptual dictionaries in which the concept(s) corresponding to each word is described. Reference characters 75a and 75b are semantic dictionaries in which the meaning of each word as given in that language is described. Each word-tag is connected to one or more of the words stored in the corresponding form dictionary 71a or 71b, has its grammatical information described in the corresponding grammar dictionary 73a or 73b, has corresponding the concept(s) described in the corresponding conceptual dictionary 74*a* or 74*b* and has its meaning described in the corresponding semantic dictionary 75*a* or 75*b*.

In this dictionary, different word-tags are assigned to different meanings of one word. Thus, a single meaning is made to correspond to each word-tag. For instance, an English word "book" has two meanings, therefore, two word-tags correspond to the word "book". One of the word-tags corresponds to a noun which means sheets of paper fastened together, on which matters are described, the other word-tag corresponds to a verb whose meaning is to reserve something.

Figures 8, 8B:
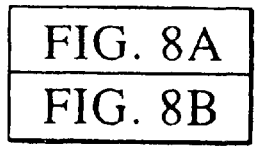
FIG. 8, which consists of FIGS. 8A and 8B, is a diagram for illustrating the structure of a form dictionary.

FIG. 8 is a diagram for illustrating the structure of an example of the form dictionary 71*a*. The form dictionary is used to establish the relation among the words, the word-tags and the grammatical forms. In the case of a verb, the possible grammatical forms are the PASTFORM (namely, the past form), the PRESFORM (namely, the present form), the PROGFORM (namely, the progressive form) etc. Further, in the case of a noun, the SINGULAR (namely, the singular form) and the PLURAL (namely, the plural form) forms may also exist. In the case of a pronoun, the SUBJECTIVE (namely, the subjective form) and the OBJECTIVE (namely, the objective form) etc. exist. These are some of the examples other categories may be provided. For instance, in the case of a noun, the classification may be made according to whether or not the noun is countable, what gender the noun has, whether the noun is a common noun or a proper noun, and so forth. Furthermore, this dictionary, also contains other information such as whether a word is of the British style, or of the American style, whether a word is in colloquial style, or in literary style and so on.

FIG. 9 is a diagram for illustrating an example of the grammar dictionary 73. This dictionary contains syntactic information concerning a word, and information concerning the position of a word in a natural language sentence. For example, regarding a verb, a large amount of position information corresponding to the cases of the active and passive voices or to the point of focus is stored therein. Further, regarding a noun, the structure of a noun phrase is determined according to the point of focus and the important points thereof. The position information is used to specify the order in which necessary attributes of the concept of a word should be described. For instance, the position information concerning a verb "go" is "Actor", "wform" and "* Iobj_direc". Thus, each slot is specified according to the "Actor" (on the basis of the information "Actor") and the "Verb" (in accordance with the fact that the form is based on the information "wform"). Further, the destination (specified by the information "Iobj_direc") appears only in this order. The mark "*" represents a preposition or a casemarker. This slot indicates that a preposition is employed. The exact preposition is determined as per the rule applicable under the circumstances.

In the case of the form of a noun, a certain noun, for example, "discussion" implies an action and requires the information concerning a slot of a verb derived from this word, namely, "discuss". Further, the word-tag for the corresponding verb is stored at an entry point.

FIG. 10 is a diagram for illustrating an example of the conceptual dictionary 74. The conceptual dictionary 74 represents a mapping from a word-tag to a concept. Each word-tag corresponds to an associated concept. As many word-tags may be mapped to the same concept, this mapping is an n-to-one mapping (where, "n" is one or more). Thus, in order to have a unique inverse mapping requires a rule or a condition. Such a rule provides information which sets conditions on the filling of slots of the knowledge structure of the concept in such a manner as to represent specific word-tags.

Further, the rules are arranged in the order of specific to general ones. For example, a rule corresponding to the word "come" is more specific than a rule corresponding to the word "go". Thus the former rule is ranked higher than the latter rule.

The CA 21 accesses this dictionary by using a word-tag, and next extracts a rule corresponding this word-tag, and further uses this rule so as to generate a request.

FIG. 11 is a diagram for illustrating the structure of "Public Document".

Figure 12:
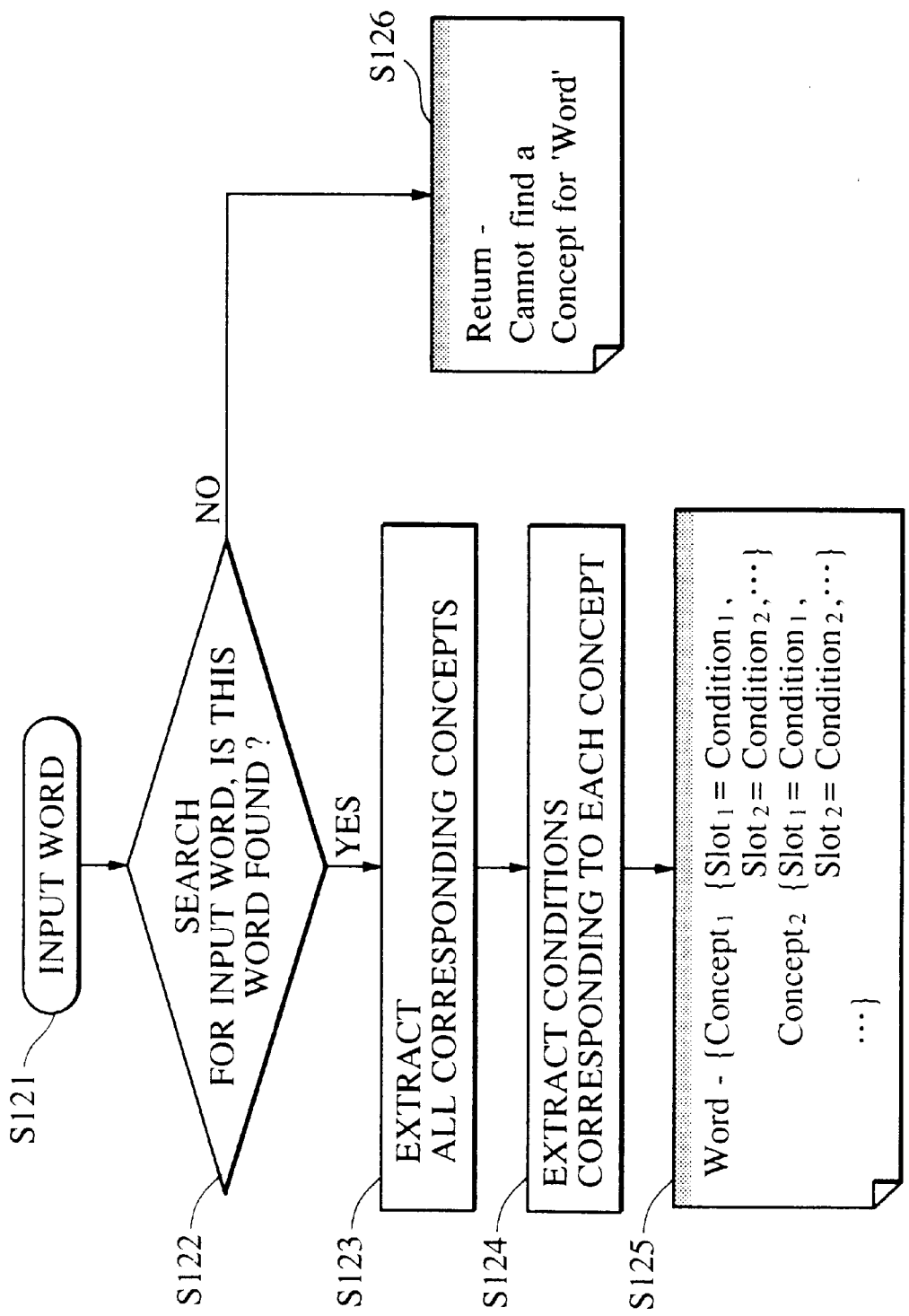
FIG. 12 is a flowchart for illustrating a process of searching for a concept corresponding to a word.

FIG. 12 is a flowchart for illustrating the process of searching for the concept(s) corresponding to an input word.

Figure 13:
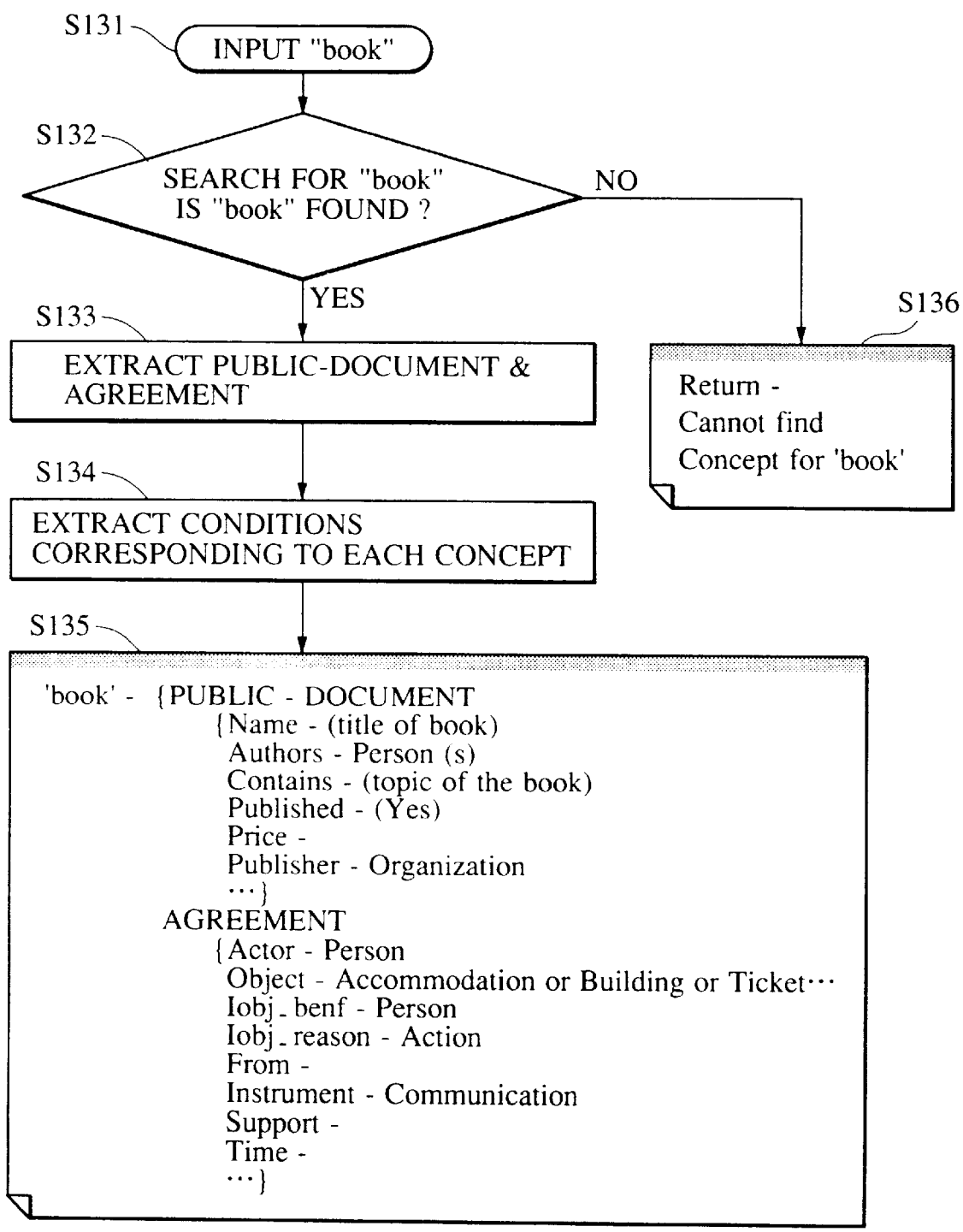
FIG. 13 is a diagram for illustrating an example of the process of searching a concept corresponding to a word.

FIG. 13 illustrates this same process for the input word "book".

In step S131, the word "book" is inputted to the system. In step S132, the form dictionary 71*a* (see FIG. 8) is searched for the inputted word "book". As shown in FIG. 8, there are two corresponding word-tags "book1" and "book2". Therefore, the concepts "PUBLIC-DOCUMENT" and "AGREEMENT" corresponding to the two word-tags, respectively, are extracted from the conceptual dictionary in step S133. Then, the conditions corresponding to each of these concepts are extracted from the dictionary (FIG. 10) and the knowledge structure, which are shown in FIGS. 11 and 37, respectively, in step S134. Subsequently, the concept and the conditions corresponding thereto are outputted in step S135. Further, in the case where no words are found in step S132, such a fact is displayed in step S136.

Figure 14:
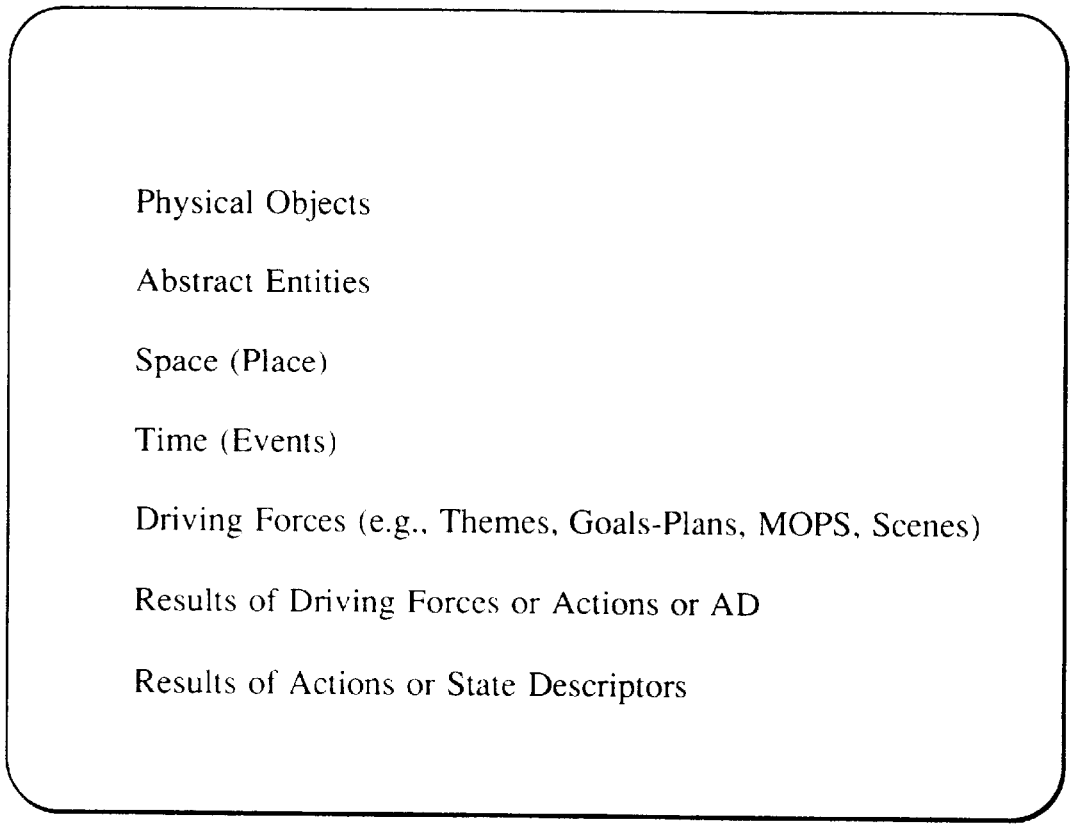
FIG. 14 is a diagram for illustrating a database of general knowledge.

FIG. 14 is a diagram for illustrating a database of general knowledge.

Figure 16:
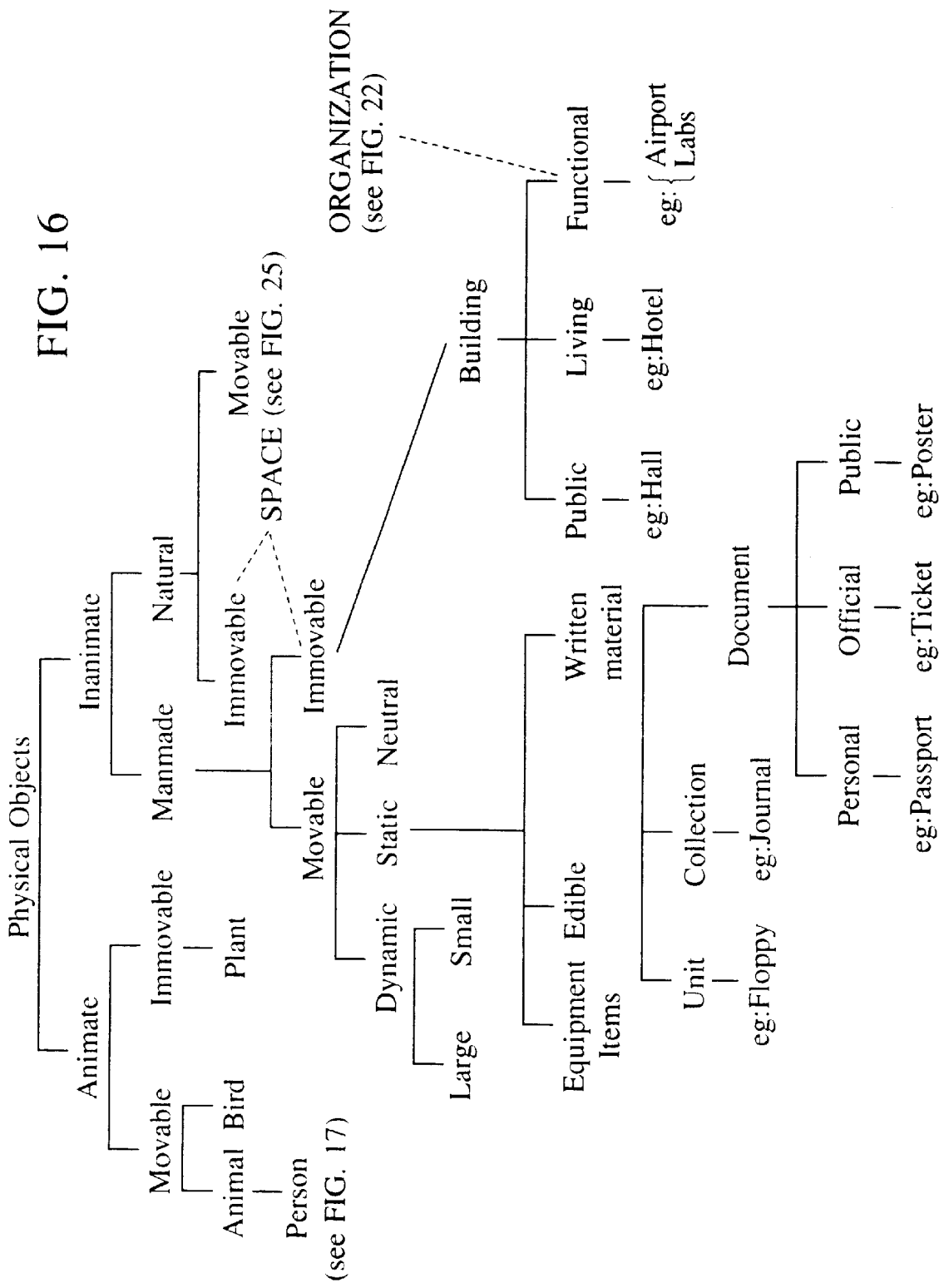
FIG. 16 is a diagram for illustrating primary structures classed as subtypes of the physical object.

FIG. 15 is a diagram for illustrating the knowledge structure of a physical object. FIG. 16 is a diagram for illustrating primary structures classed as subtypes of the physical object.

FIG. 17 is a diagram for illustrating the knowledge structure of a person. FIG. 18 is a diagram for illustrating an example thereof. FIG. 19 is a diagram for illustrating an example of the draft instance of person.

Figure 21:
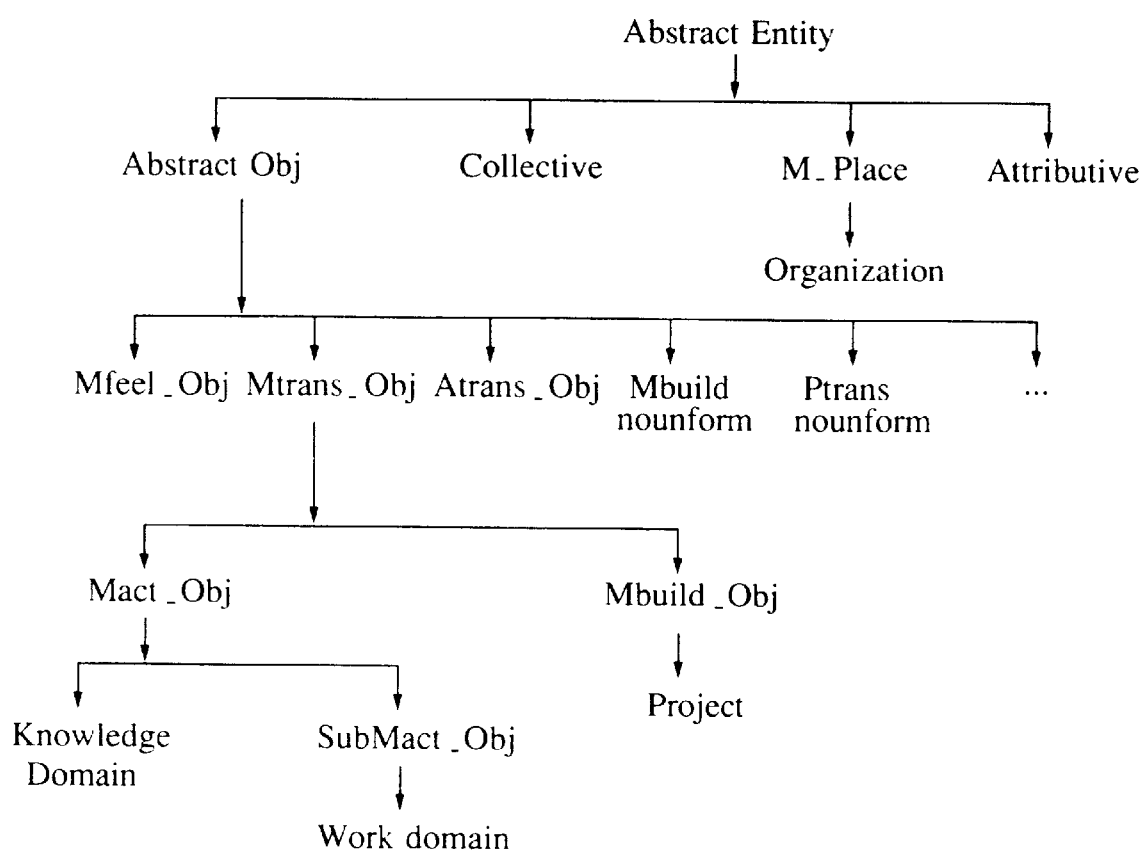
FIG. 21 is a diagram for illustrating primary structures classed as subtypes of the abstract entity.

FIG. 20 is a diagram for illustrating the knowledge structure of an abstract entity. FIG. 21 is a diagram for illustrating primary structures classed as subtypes of the abstract entity.

FIG. 22 is a diagram for illustrating the knowledge structure of an organization. FIG. 23 is a diagram for illustrating an example of the organization.

FIG. 24 is a diagram for illustrating the knowledge structure of a knowledge domain and an example thereof.

Figure 25:
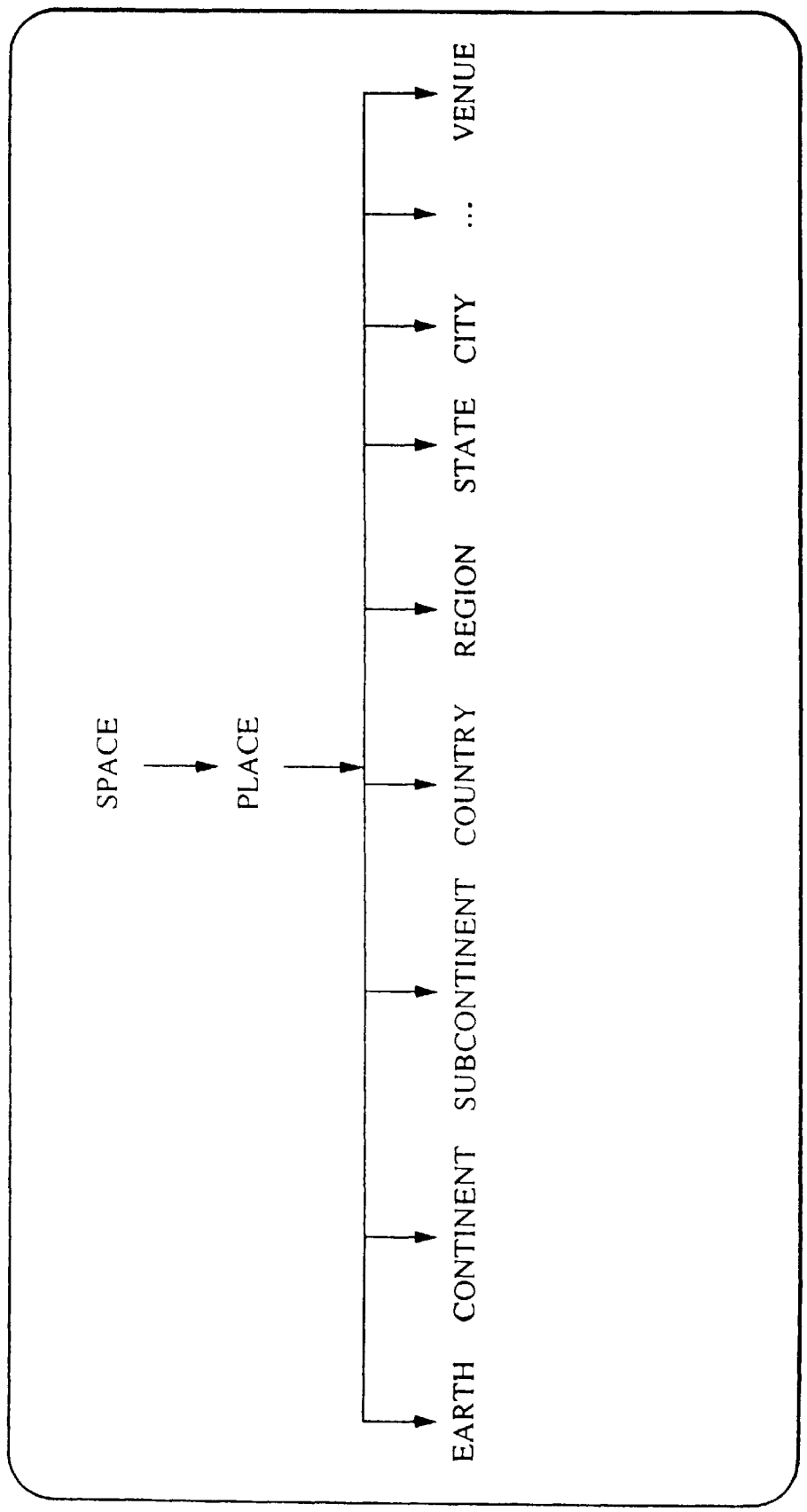
FIG. 25 is a diagram for illustrating primary structures classed as subtypes of space.

FIG. 25 is a diagram for illustrating primary structures classed as subtypes of space. FIG. 26 is a diagram for illustrating the knowledge structures of a place and a country and an example thereof.

Figure 27:
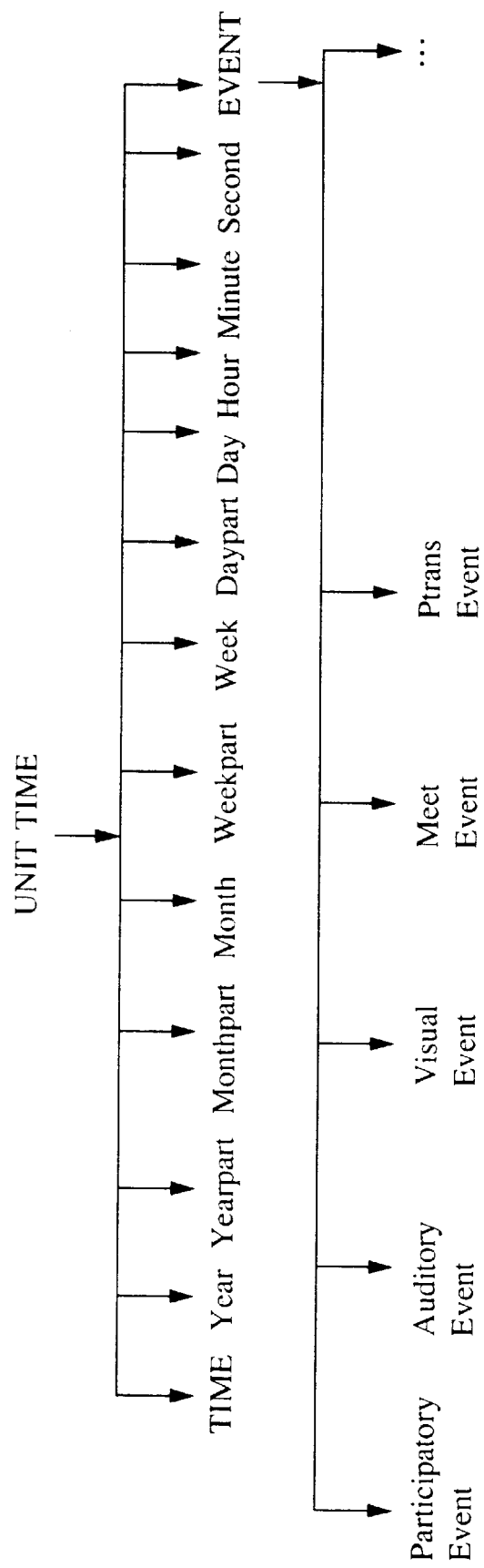
FIG. 27 is a diagram for illustrating primary structures classed as subtypes of a unit time.

FIG. 27 is a diagram for illustrating primary structures classed as subtypes of unit time. FIG. 28 is a diagram for illustrating the knowledge structures of the unit time and time.

Figure 30:
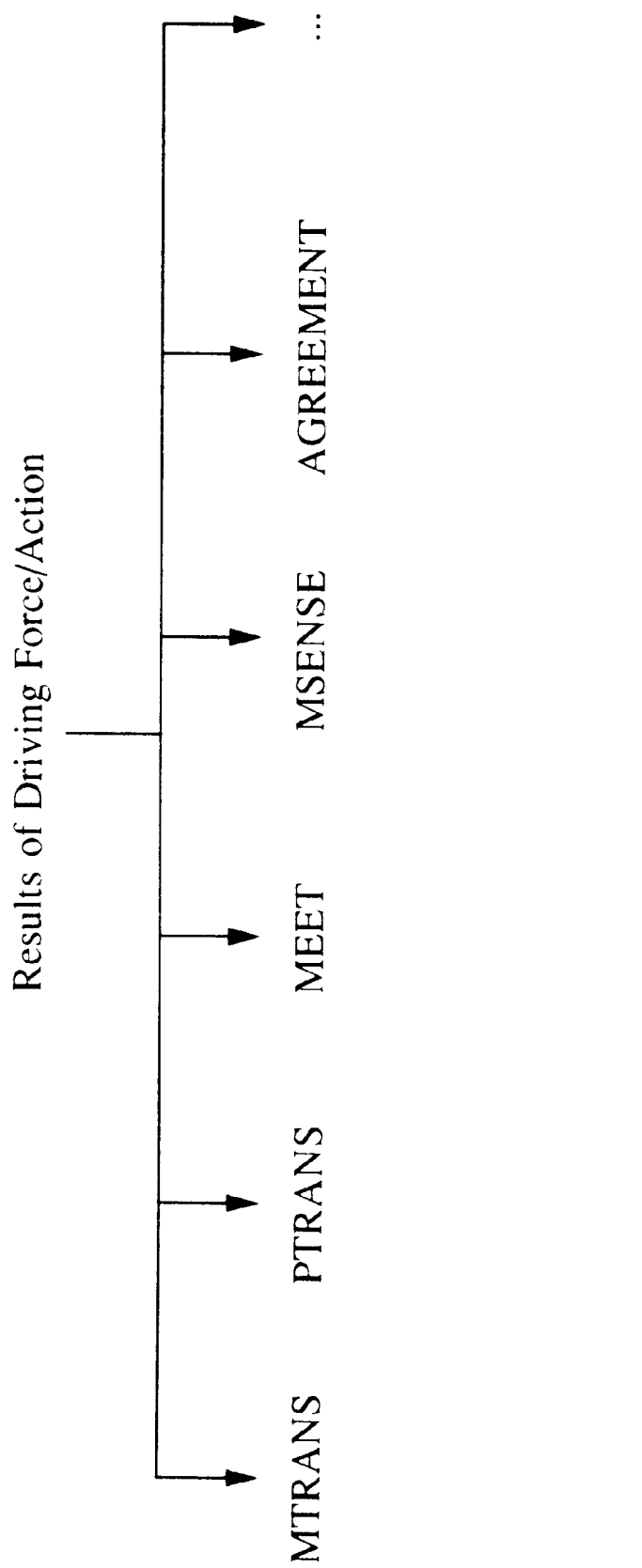
FIG. 30 is a diagram for illustrating primary structures classed as subtypes of the ACTION.

FIG. 29 is a diagram for illustrating the knowledge structure of an action. FIG. 30 is a diagram for illustrating primary structures classed as subtypes of the action.

FIG. 31 is a diagram for illustrating the knowledge structure of MEET. FIG. 32 is a diagram for illustrating the draft instance of MEET.

Figure 33:
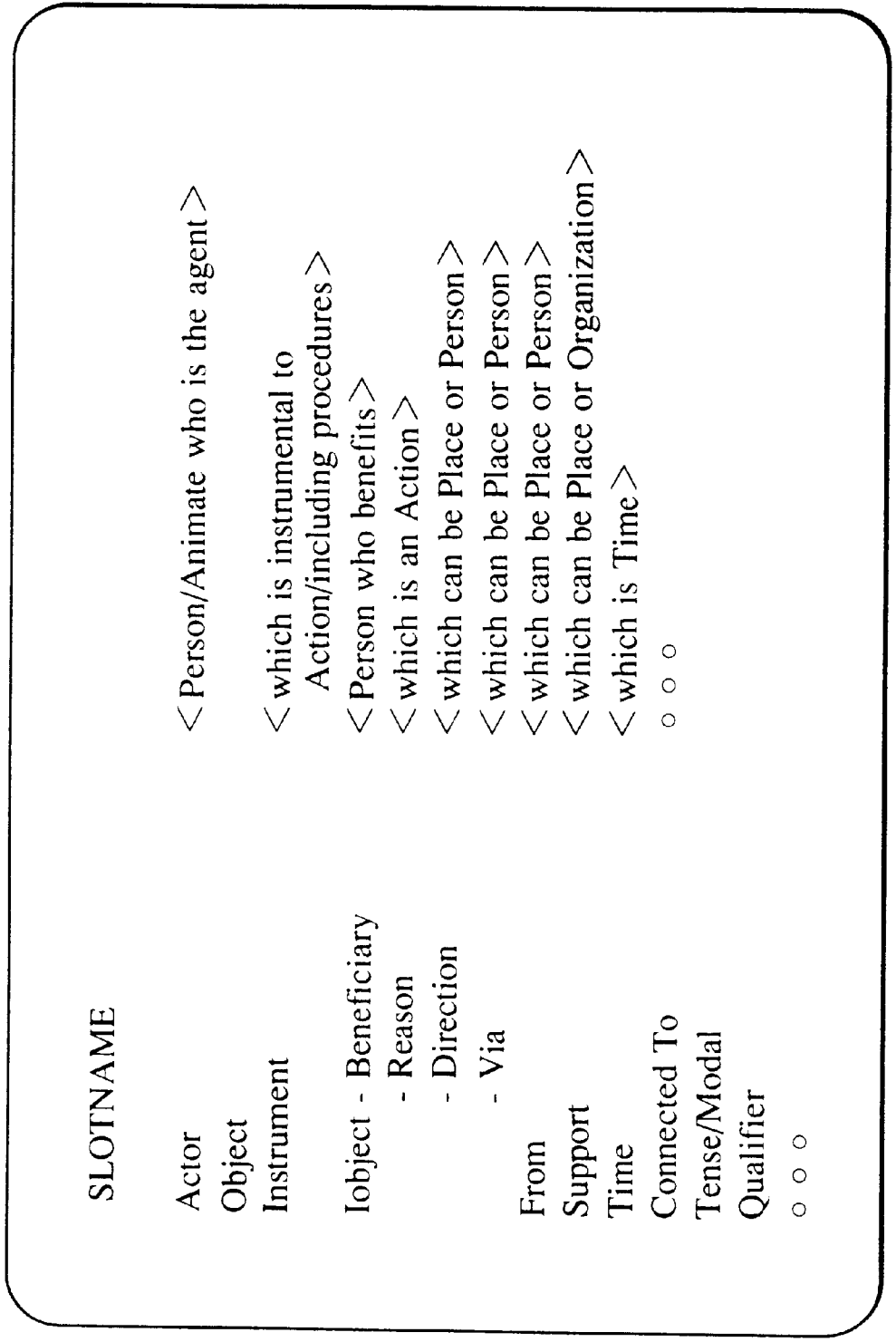
FIG. 33 is a diagram for illustrating the knowledge structure of PTRANS.

FIG. 33 is a diagram for illustrating the knowledge structure of PTRANS. FIG. 34*a* is a diagram for illustrating the draft instance of PTRANS. FIG. 34b is a diagram for illustrating the draft instance of PTRANS for the verb "come".

FIG. 35 is a diagram for illustrating the knowledge structure of MTRANS. FIG. 36 is a diagram for illustrating the knowledge structure of MSENSE. FIG. 37 is a diagram for illustrating the knowledge structure of AGREEMENT.

Figure 38:
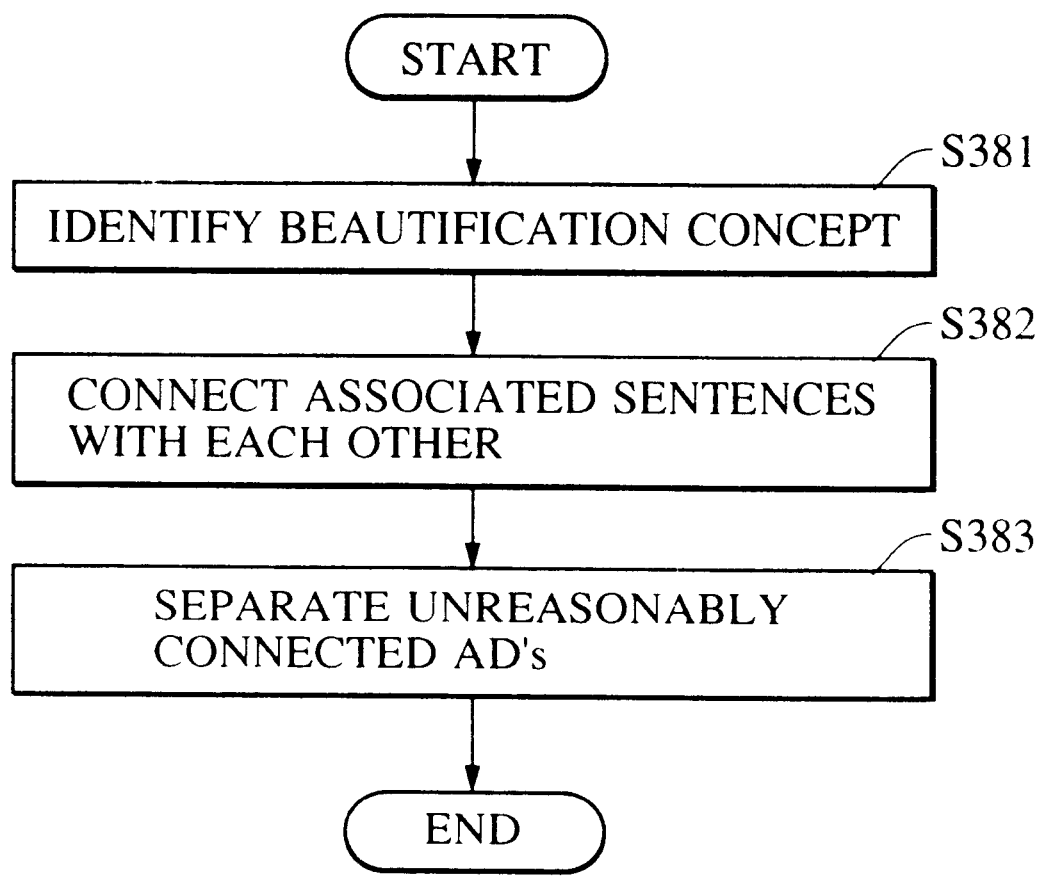
FIG. 38 is a flowchart for illustrating a processing to be performed by a post-conceptual-analyzer (hereunder abbreviated as post-CA)

FIG. 38 is a flowchart for illustrating a processing to be performed by the post-CA 213. Further, FIGS. 39a, 39b and 39c are diagrams for illustrating objects and results of a processing to be performed by the post-CA 213.

First, in step S381, in FIG. 38, a beautification concept is identified. For instance, in the case where the input information represents "I would like to meet you", result of the processing performed by the main CA 212 is illustrated as OUTPUT in FIG. 39a. In this case, the outer AD "WANT" is identified as the beautification concept in step S381.

Next, in step S382, associated statements are connected with each other. For instance, in the case where the statements (1) and (2) of FIG. 39b are inputted, result of the processing performed by the main CA 212 becomes two AD's shown as OUTPUT in FIG. 39b. In this case, two AD's are connected to each other as cause-effect, as a result of step S382, as illustrated in this figure by OUTPUT-P.

Further, in step S383, the unreasonable connections between AD's are severed. For instance, in the case where the input information represents "reserve accommodation and pick up", result of the processing performed by the main CA 212 is shown as OUTPUT in FIG. 39c. Here, the concept "MEET" (corresponding to "pick up") is connected to the concept "AGREEMENT" by an AND relation (incidentally, this means "and"). This is disconnected so as to becomes two independent AD's in this step as shown in OUTPUT-P.

Hereinafter, a practical example of the procedure will be described. First, it is assumed that the information shown in FIG. 40a is inputted. The processing is performed according to the flowcharts of FIGS. 5 and 6.

First, in the pre-CA 211, ELIST, WLIST, CLIST, RLIST are initialized. The input information of FIG. 40b is set as the initial expectation at the start of the processing.

In the main CA 212, the word "John" is as the first word to be processed. When the LKB is searched, the meaning of the word "John" is found as illustrated in FIG. 40c. The information of FIG. 40c indicates that the word "John" is the name of a person and the part of speech thereof is a noun. Consequently, the draft instance C1 given in FIG. 40d is created. Further, the linguistic concept Lc1 (as illustrated in FIG. 40e) corresponding to C1 is also created. Thus, the expectation that the word represents a subject is satisfied. Therefore, the next expectation is set for a verb.

Then, "sent" is found to be the next word to be processed. The searching of the LKB reveals that this is the past form of the verb "send" and the corresponding information from LKB is given in FIG. 40f. The constraints for "send", as specified by the LKB, and the constraints inherent to the knowledge structure of the PTRANS are merged together to creat the draft instance C2 given in FIG. 40g. Furthermore, the linguistic concept Lc2 corresponding to C2 is created (given in FIG. 40h). Then, the position information (see FIG. 40i), according to which, a sentence using this verb may be formed, is read from the LKB. The subject of the verb, namely, the concept C1 (namely, a person) is filled in the actor slot of C2. The next expectation is set to be for a grammatical object which can be the OBJECT (namely, a physical or abstract entity) of C2.

The next word to be processed is found to be "book". When searching the LKB, two meanings (namely, AGREE-MENT and PUBLIC-DOCUMENT) given in FIG. 41a are obtained. However, as the expectation at this stage is for an OBJECT (namely, the physical object or abstract entity) the AGREEMENT meaning is not suitable. Thus, only the PUBLIC-DOCUMENT meaning is applicable. Consequently, the ambiguity of the word "book" is eliminated. The draft instance C3 and the corresponding linguistic concept Lc3 of FIG. 41b are created similarly as in the aforementioned case. As the draft instance C3 does not correspond to a person, only the Position Infol of the position information given in FIG. 40i is applicable and the draft instance C3 is inferred to be the object of PTRTANS (i.e., C2). From the Position Infol, the next expectation is set to be for a person corresponding to the "Iobj-benf" of the PTRANS, which is expected to be preceded by a casemarker (namely, "to").

Then, "to" is found to be the next word. Its meaning given in FIG. 41c is found from the LKB and correspondingly the draft instance C4 of FIG. 41d and the linguistic concept Lc4 of FIG. 41e are created similarly as in the aforesaid cases. As the result of finding this word "to", the revised expectation is set for "Iobj-benf (Person)", or "Iobj-benf (Place)", or "Iobj-benf (Action)".

Then, "Mary" is found to be the next word. Its meaning given in FIG. 41f is found from the LKB, the draft instance C5 of FIG. 41g and the linguistic concept Lc5 of FIG. 41h are created similarly as in the aforesaid cases. Moreover, because the request for the casemarker is satisfied, the draft instance C5 is attached as the "Iobj-benf" of the PTRANS (i.e., C2). Final result is shown in FIG. 42.

Hereunder, another example will be described by referring to FIG. 43. In the case where the question (1) of this figure is inputted, possible answers are illustrated as those (a) to (c) in this figure. Thus the pre-CA sets expectation from the context (in this case, a question in a colloquy) so that even an incomplete statement, which would not be easily parsed by an ordinary analysis depending upon the construction thereof, can be analyzed. In this case, the pre-CA of the CA of this embodiment sets "the purpose of a visit" as the expectation. Therefore, the answer (a) of this figure can be analyzed.

Further, in the case of inputting the information (2) of this figure, the pre-CA and the main CA perform the processing similarly as in the foregoing cases. The post-CA, however, analyzes the structure of the concept and performs the deletion or the modification thereof to thereby output only necessary information. In the case of this illustrative statement, an output (d) of this figure, which is equivalent to the sentence "I want to write to John", is obtained.

In the case where the statement (1) of FIG. 44 is inputted as a further example, draft instances are created depending upon the subsequent information, namely, upon the meaning of the statement, correspondingly to the two meanings of the word "visit". For instance, in the case where the continued input (2) is the expression (c) of this figure, the meaning of the word "visit" is inferred to be (a) of this figure from the fact that the person (namely, the listener) is "you". Thus the ambiguity in the statement is eliminated. In the case where the continued input (2) is the expression (d) of this figure, the meaning of the word "visit" is inferred to be (b) of this figure from the fact that the "Human Computer Interaction labs" is a building. Thus the ambiguity in the statement is similarly eliminated.

Next, the case of processing Japanese family register information will be described hereinafter as still another example of processing natural language information described or represented in the predetermined format. The Japanese family register information is not described in the form of a continuous text but is formed by enumerating predetermined items in a predetermined order.

FIG. 45 is a diagram for illustrating the knowledge structure of the place stored in the WKB 51.

Figure 46:
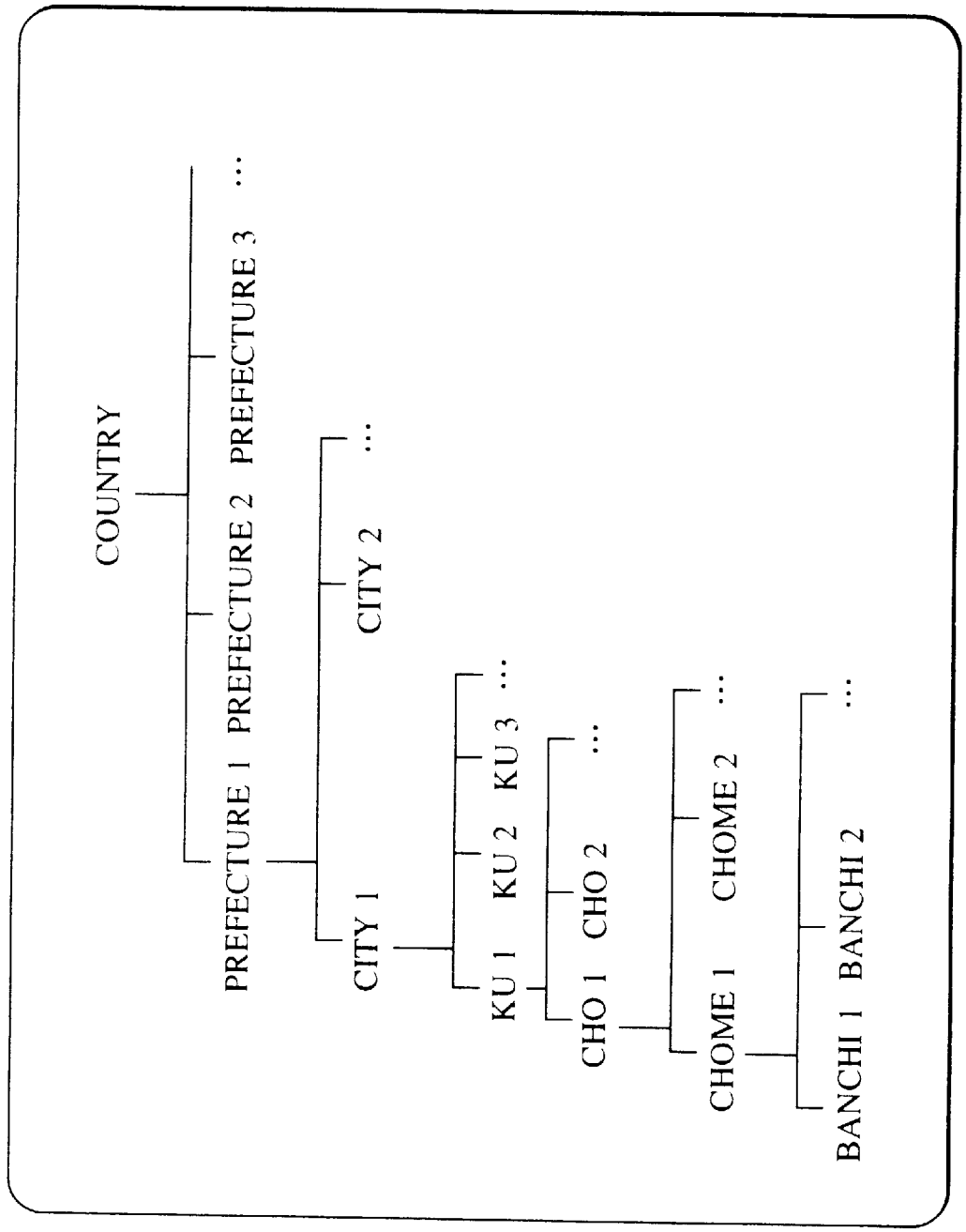
FIG. 46 is a diagram for illustrating the knowledge representation of the country.

FIG. 46 is a diagram for illustrating the relation among the country, the prefecture, the city and so on as a hierarchical knowledge structure.

Figure 47:
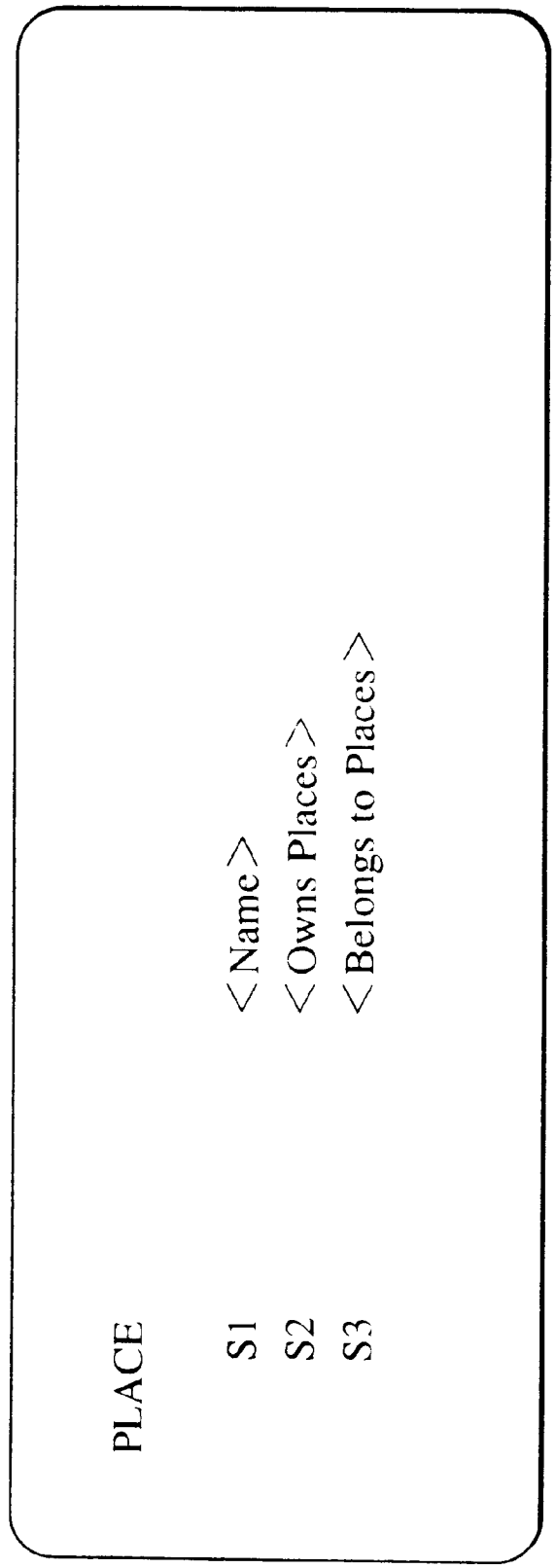
FIG. 47 is a diagram for illustrating the general knowledge structure of the place.

FIG. 47 is a diagram for illustrating the general knowledge structure of the place. This structure has three slots S1, S2 and S3. The slot S1 represents <NAME>, in which the name of the place is described. The slot S2 represents <Owns Places>, wherein the places owned by this place are listed. The slot S3 represents <Belongs to Places>, wherein the place to which this place belongs is specified.

FIG. 48 is a diagram for illustrating the knowledge structure in the case where the place of the foregoing description of FIG. 47 is a city. In the slot S1, the name of the city is described. If the city has one or more wards (namely, "ku" in Japanese), all of the names of the wards are described in the slot S2. Even if the city has no ward but has one or more towns (namely, "cho" or "machi" in Japanese), each of which has a rank lower than the rank of the city by one level, all of the names of the towns are described in the slot S2. In slot S3, name of the state/prefecture (namely, "ken" in Japanese) to which the city belongs, is specified.

FIG. 49 is a diagram for illustrating a practical example of the knowledge structure of the city of FIG. 48, namely, the knowledge structure of YOKOHAMA city.

FIG. 50 is a diagram for illustrating the general knowledge structure of an address. As shown in this figure, there are seven slots S1 to S7, which correspond to the country, the prefecture, the city, the "ku" (namely, the ward), the "cho" (namely, the town), the "chome" and the "banchi" (namely, the lot No.), respectively.

Figure 51:
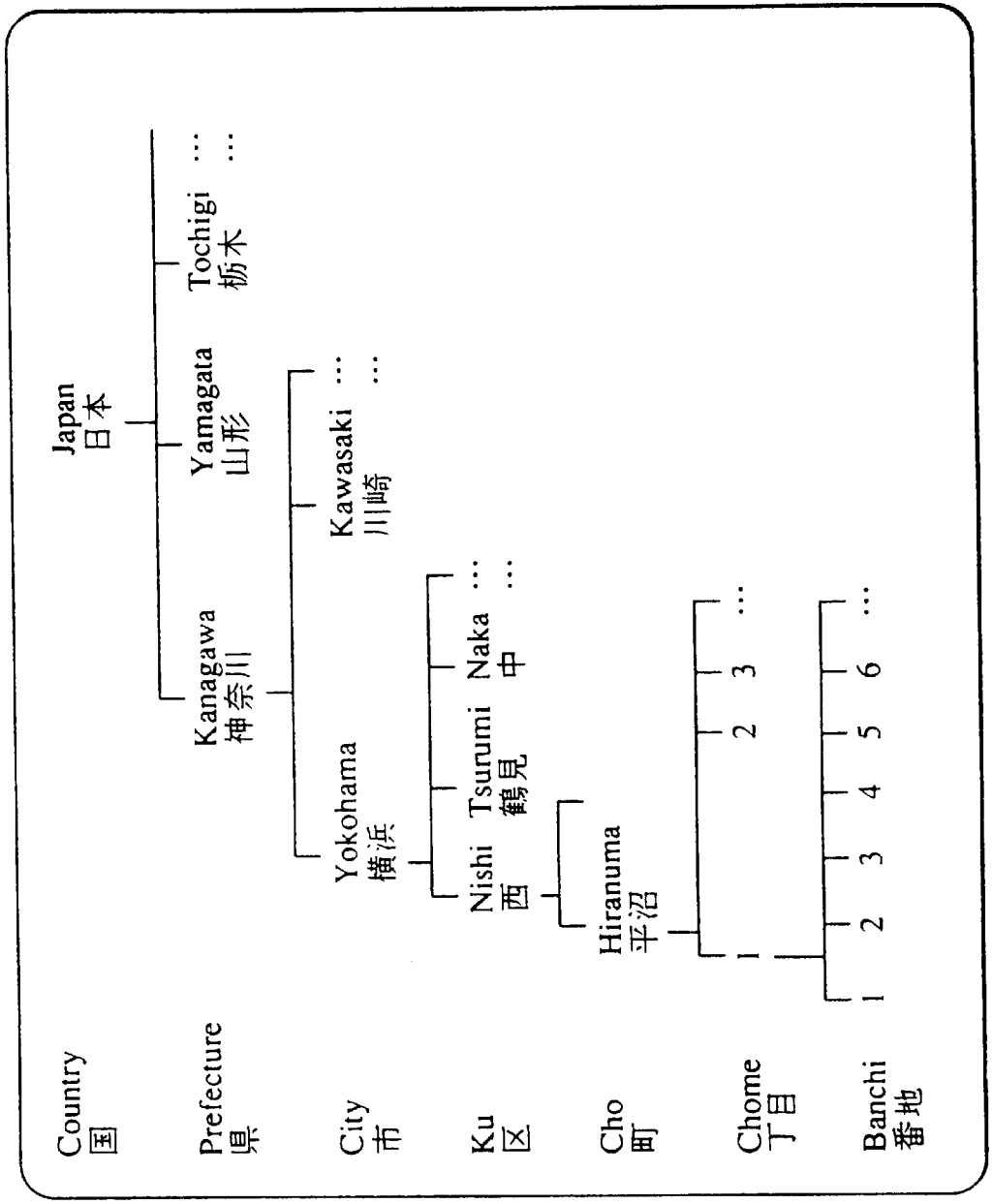
FIG. 51 is a diagram for illustrating the detailed knowledge representation of the places in JAPAN.

FIG. 51 is a diagram for illustrating the hierarchical knowledge structure of the places in JAPAN.

FIG. 52 is a diagram for illustrating the knowledge structure of the "person" as used for analyzing the family register.

FIG. 53 is a diagram for illustrating the knowledge structure of the "action". The slot S1 corresponds to the agent of the action; the slot S2 to the Object (namely, the direct object) of the action; the slot S3 to the Iobject (namely, the indirect object) of the action; the slot S4 to an action serving as the reason for the indirect object; the slot S5 to a place from which the action is performed; the slot S6 to an action serving as the instrument; the slot S7 to a place serving as the support; and the slot S8 to the time.

In the foregoing description, the knowledge structures stored in the WKB have been described. Next, the knowledge structures depending upon the field of information to be processed will be described hereinbelow. Hereunder, the knowledge for processing a family register will be described.

FIG. 54 is a diagram for illustrating the knowledge structure of a family register. The slot S1 corresponds to the legal domicile; the slot S2 to the holder of the family register; the slot S3 to the action; the slot S4 (described on the bottom line) to the page number. In the case of this S4, <PAGE> is put in braces { }. This means that the page is an optional slot.

FIG. 55 is a diagram for illustrating the knowledge structure of the page of the family register. FIG. 56 is a diagram for illustrating the knowledge structure of the block of the family register. The slot S1 corresponds to the owner of this block; the slot S2 to the declaration; the slot S3 to the relation between a person and the owner of the family register; the slot S4 to the Rank of a female or male child among the children of the same sex of the owner of the family register; and the slot S5 to the distinction of sex. Additionally, if a child is an adopted one, such a fact is described in the slot S6.

FIG. 57 is a diagram for illustrating the contents of a general dictionary. The concepts representing the information listed on the left side thereof are described on the right side thereof, as shown in this figure.

FIG. 58 is a diagram for illustrating the contents of a dictionary of a specific field, in this case, the contents of the dictionary pertaining to the field of the family register.

FIG. 59 is a diagram for illustrating the examples of rules for describing general knowledge information to be stored in the WKB.

FIG. 60 is a diagram for illustrating rules for description of the knowledge specific to the field of the family register to be stored in DKB.

Next, a procedure of processing family register information in this system embodying the present invention by using a practical example of input information will be described hereinbelow as an example of the procedure performed by this system.

FIG. 61 is a diagram for illustrating an example of the read family register information. Here, it is assumed that the information of this figure is inputted to the system by means of an optical character reader (OCR) and that before theprocessing of the text written in an upper left portion of this family register, the information representing the legal domicile and the owner (namely, the house-holder) written in a right-side portion of this family register and the information representing the names of father and mother of each member of this family, which are written in the bottom portion of this register, have bee preliminarily processed.

Further, it is supposed that the sentence " 平成元年壱月弐拾七日横浜市鶴見区で出生同月弐拾九日父届出入籍 (The undermentioned person was born at Chuo-ku, Metropolis of Tokyo, on Jun. 20, 1944 (19th year of Showa era)". His birth was reported by his father and his name was entered into the family register of his father on 25th of the same month)" is first inputted.

In this case, the empty instances of the MTRANS1 and the EVENT1 of FIG. 62 are created in the context setting step 211 from the knowledge of step S2 of FIG. 56, namely, from the knowledge that the entire statement of this block of the family register corresponds to the action "届出(declaration)", that is, the MTRANS corresponding to an EVENT which has already occurred.

Further, the owner of the block is set as the actor of the EVENT, and the Time-Phrase of the EVENT1 is expected in accordance with the rules for describing the information in the family register.

Next, the CA processes the aforementioned input information word by word. On referring to the information in the dictionary of FIG. 57, the concept for "平成 (Heisei)" is found to be the <Era Name> which matches the expectation for Time-Phrase. Thus, this concept <Era=Heisei> is filled in the slot S1 of the time2 of FIG. 62 by performing the processing in step S511 of FIG. 5. Next, "元 (first)" is set as <NUMBER=1> from the dictionary of FIG. 57 and is further made to fill the slot <Year (=1)> in the slot S1 of the time2 of FIG. 62, after ensuring that the next character "年 (year)" corresponds to the <Year Mark> and is itself disregarded as a delimiter. Here, a delimiter is utilized as a mark for separating individual items in continuous input information and for indicating what the precedent and subsequent information represent. Similarly, the concept "老 (1)" is filled in the slot S2 of the time2 considering that the expectation is for month and it is followed by the character "月 (month)" which is the <Month Mark>. Further, the character "月 (month)" is itself disregarded as the <Month Mark>. Similarly, the concept "弐拾七 (27th)" is filled in the slot S3 of the time2 and the character "日 (day)" is disregarded as the <Day Mark>.

Next, the concept corresponding to "横浜 (Yokohama)" is obtained. This corresponds to the <City Mark>. Thus it is inferred from the rule of FIG. 60 that this indicates the beginning of the Address-Phrase. Then, the expectation is updated to be for the "address" and the concept for "横浜 (Yokohama)" is filled in the slot S3 of the address2. The next character "市 (city)" is disregarded as the <City Mark>. Similarly, the concept for " 鶴見 (Tsurumi)" is filled in the slot S4 of the address2 and the character "区 (ku (ward))" is disregarded as the <Ku mark>.

The next character "で (at)" is the casemarker. Thus, it is inferred from the rules given in FIG. 60 that this indicates the end of the Address-Phrase. Then, the expectation is updated to be for "出生 (birth)" which is a kind of the declaration.

The next word "出生 (birth)" denotes the concept <Birth> from the dictionary given in FIG. 58. Therefore, it is inferred from the rule of FIG. 60 that the type of the "Event 1", which is the Object of the declaration (MTRANS), is BIRTHCD. Then, the expectation is updated to be for "Time-Phrase".

The next character "同 (same)" corresponds to the <Pronoun 1>. Therefore, the same information as stored in the slot S2 of the time2 is filled in the slot S2 (Month) of the time1 after processing the next word which is "月 (month)", the <Month Mark>. Further, the information contained in the slot S1 of the time2 is copied onto the slot S1 (Era, Year) of the time1 which represents a higher-order part of the time information. As before, the character "月 (month)" is disregarded. Further, the concept corresponding to "弐拾七 (27th)" is filled in the slot S3 of the time1 and the character "日 (day)" is disregarded as the <Day Mark>.

The next word "父 (father)" corresponds to the <Person 1>. It is inferred from this that the Time-Phrase has terminated and the expression representing the concept <Person> has begun. Here, note that the slots information regarding the person represented by the "父 (father)" can be obtained from the block information.

The next word "届出 (declaration)" corresponds to the concept <Declaration> in the dictionary of the FIG. 58. Further, it is inferred from the rule of FIG. 60 that the action represented by the MTRANS is performed by the person represented by the <Person1>. Therefore, <Person1> is filled in the slot S1 of the MTRANS1. Further, the expectation is updated according to the rule of FIG. 60 to be the Time-Phrase of the information {Diff Birthplace}.

The next expression "入籍 (Entry in Family Register)" denotes the concept <Entry in Family Register> in the dictionary given in FIG. 58. Here, the Time-Phrase is not found. Thus it is inferred from the rule of FIG. 60 that the rule "Diff Birth-place" is not applicable in this case and that the analysis of this statement is successful. Thereby, the address represented by the <Address1> is assumed to be the same as the legal domicile of the holder of this family register. Thus this information representing the domicile information is copied onto the slot <Address1>. Consequently, the information in the slot <Address1> has the address "横浜市鶴見区 (Tsurumi-ku Yokohama City)".

FIG. 63 is a diagram for illustrating the result of the processing described just hereinabove.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A natural language processing system comprising:
   input means for inputting information represented in a natural language, the information including first information and second information, wherein the second information appears subsequent to the first information in a sequence of natural language information, and the second information is incomplete;
   a knowledge base for storing therein knowledge concerning a domain of information to be inputted, general knowledge and linguistic knowledge;
   analysis means for analyzing the first information and the second information inputted from said input means by referring to the knowledge stored in the knowledge base;
   expectation means for expecting an attribute of the second information on the basis of a result of an analysis of the first information performed by said analysis means; and
   expectation information storing means for storing the attribute of the second information expected by said expectation means, as expectation information,
   wherein, when said analysis means analyzes the second information, said analysis means compensates for the incompleteness of the second information based on the expectation information.

2. The natural language processing system according to claim 1, which further comprises preprocessing means for performing a preliminary analysis corresponding to the attribute of the second information expected by said expectation means.

3. The natural language processing system according to claim 2, wherein said preprocessing means prepares a knowledge structure corresponding to the kind of information, which is expected by said expectation means.

4. The natural language processing system according to claim 1, which further comprises updating means for updating contents of information, which is stored in said expectation information storing means, on the basis of a result of an expectation made by said expectation means.

5. The natural language processing system according to claim 1, which further comprises extraction means for extracting specific data from the natural language information inputted from said input means, on the basis of a result of an analysis made by said analysis means.

6. The natural language processing system according to claim 5, wherein the information represents the contents of a document of a specific domain, wherein said knowledge base has knowledge of the specific domain, and wherein said extraction means refers to the knowledge of the specific domain stored in said knowledge base and extracts specific data.

7. The natural language processing system according to claim 1, wherein said input means inputs a set of sentences, wherein said analysis means processes a set of sentences as sentence by sentence and outputs concepts as a result of an analysis.

8. The natural language processing system according to claim 7, which further comprises identification means for identifying a beautification concept which beautifies another concept among the concepts outputted by the analysis means.

9. The natural language processing system according to claim 7, which further comprises connection means for connecting associated concepts with one another among a plurality of concepts outputted by the analysis means.

10. The natural language processing system according to claim 7, which further comprises separation means for separating concepts, which are unsuitably connected with one another, from among concepts outputted by the analysis means.

11. The natural language processing system according to claim 1, wherein when the second information is ambiguous, said analysis means eliminates the ambiguity of the second information based on the expectation information.

12. A natural language processing method comprising:

the input step of inputting information in a natural language, the information including first information and second information, wherein the second information appears subsequent to the first information in a sequence of natural language information, and the second information is incomplete;

the analysis step of analyzing the first information and the second information inputted at said input step in a sequence of natural language information inputted at said input step by referring to knowledge stored in a knowledge base which stores therein knowledge concerning a domain of information to be inputted, general knowledge and linguistic knowledge;

the expectation step of expecting an attribute of second information on the basis of a result of an analysis of the first information performed in said analysis step; and the expectation information storing step of storing the attribute of the second information expected in the expectation step, in an expectation information memory as expectation information, wherein, when the second information is analyzed in the analysis step, compensation for the incompleteness of the second information is performed based on the expectation information.

13. The natural language processing method according to claim 12, which further comprises the preprocessing step of performing a preliminary analysis corresponding to the attribute of the second information expected in the expectation step.

14. The natural language processing method according to claim 13, wherein in the preprocessing step, a knowledge structure corresponding to the kind of information, which is expected in the expectation step, is prepared.

15. The natural language processing system according to claim 12, which further comprises the updating step of updating contents of information, which is stored in the expectation information memory, on the basis of a result of an expectation made in the expectation step.

16. The natural language processing method according to claim 12, which further comprises the extraction step of extracting specific data from the natural language information, which is inputted in the input step, on the basis of a result of an analysis made in the analysis step.

17. The natural processing method according to claim 16, wherein the information represents the contents of a document of a specific domain, wherein the knowledge base has knowledge of the specific domain, and wherein in the extraction step, the knowledge of the specific domain stored in the knowledge base is referred to and specific data is extracted.

18. The natural language processing system according to claim 12, wherein in the input step, a plurality of sentences are inputted, wherein in the analysis step, a set of sentences are processed as sentence by sentence and concepts are outputted as a result of an analysis.

19. The natural language processing system according to claim 18, which further comprises the identification step of identifying a beautification concept which beautifies another concept among the concepts outputted in the analysis step.

20. The natural language processing system according to claim 18, which further comprises the connection step of connecting associated concepts with one another among a plurality of concepts outputted in the analysis step.

21. The natural language processing system according to claim 18, which further comprises the separation step of separating concepts, which are unsuitably connected with one another, from among concepts outputted by the analysis means.

22. The natural language processing method according to claim 12, wherein in said analysis step, when the second information is ambiguous, elimination of the ambiguity of the second information is performed based on the expectation information.

23. A computer-readable storage medium storing a natural language processing program for controlling a computer to process natural language information, said program comprising codes for causing the computer to perform:

the input step of inputting information in a natural language, the information including first information and second information, wherein the second information appears subsequent to the first information in a sequence of natural language information, and the second information is incomplete;

the analysis step of analyzing the first information and the second information inputted at said input step by referring to knowledge stored in a knowledge base, which stores therein knowledge concerning a domain of information to be inputted, general knowledge and linguistic knowledge;

the expectation step of expecting an attribute of second information on the basis of a result of an analysis of the first information performed in said analysis step; and the expectation information storing step of storing the attribute of the second information expected in the expectation step, in an expectation information memory as expectation information, wherein, when the second information is analyzed in the analysis step, compensation for the incompleteness of the second information is performed based on the expectation information.

* * * * *

UNITED STATES PATENT AND TRADEMARK OFFICE
CERTIFICATE OF CORRECTION

PATENT NO. : 6,052,656

DATED : April 18, 2000

INVENTOR(S): ARUNA ROHRA SUDA, ET AL.

It is certified that error appears in the above-identified patent and that said Letters Patent is hereby corrected as shown below:

SHEET NO. 37:
Figure 36, "<whith is Time>" should read --<which is Time>--.

COLUMN 1:
Line 41, "natural-language" should read --natural language--;
Line 45, "natural-language" should read --natural language--;
Line 49, "natural-language" should read --natural language-- and
Line 53, "natural-language" should read --natural language--.

COLUMN 3:
Line 3, "to -the" should read --to the--.

COLUMN 5:
Line 25, "a" should be deleted.

COLUMN 7:
Line 5, "a" should be deleted; and
Line 67, "attached" should read --attach--.

COLUMN 8:
Line 2, "returns" should read --return--.

COLUMN 11:
Line 32, "becomes" should read --become--.

UNITED STATES PATENT AND TRADEMARK OFFICE
CERTIFICATE OF CORRECTION

PATENT NO. : 6,052,656

DATED : April 18, 2000

INVENTOR(S): ARUNA ROHRA SUDA, ET AL.

Page 2 of 2

It is certified that error appears in the above-identified patent and that said Letters Patent is hereby corrected as shown below:

COLUMN 12:
Line 12, "PTRANS" should read --PTRANS--.

COLUMN 14:
Line 26, "thep-" should read --the--;
Line 27, "rocessing" should read --processing--;
Line 33, "bee" should read --been--; and
Line 67, "infor-" should read --information represent--.

COLUMN 15:
Line 1, "motion represent" should be deleted.

Signed and Sealed this

Twenty-second Day of May, 2001

Attest:

NICHOLAS P. GODICI

Attesting Officer     Acting Director of the United States Patent and Trademark Office